United States Patent
Gotoh et al.

(10) Patent No.: US 6,954,428 B2
(45) Date of Patent: Oct. 11, 2005

(54) INTENSIVE MANAGEMENT APPARATUS FOR CHECKING PATH VALIDITY IN TIME-SHARING MULTIPLEXING NETWORK

(75) Inventors: Tomonori Gotoh, Kawasaki (JP); Takashi Saito, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 939 days.

(21) Appl. No.: 09/777,333

(22) Filed: Feb. 6, 2001

(65) Prior Publication Data

US 2002/0031087 A1 Mar. 14, 2002

(30) Foreign Application Priority Data

Sep. 8, 2000 (JP) .................................. 2000-273199

(51) Int. Cl.[7] .......................... H04L 12/28; H04L 5/22; H04J 3/00; G06C 25/00
(52) U.S. Cl. .................. 370/230.1; 370/248; 370/254; 709/224
(58) Field of Search ................ 370/229–231, 370/235, 238, 241, 245, 248–254, 255, 389, 400, 442, 458, 357, 372, 375, 386, 392, 463, 466; 709/222, 223, 224, 225

(56) References Cited

U.S. PATENT DOCUMENTS

| | | | | |
|---|---|---|---|---|
| 5,416,768 A | * | 5/1995 | Jahromi | 370/360 |
| 5,459,720 A | * | 10/1995 | Iliev et al. | 370/393 |
| 5,784,377 A | * | 7/1998 | Baydar et al. | 370/463 |
| 5,815,490 A | * | 9/1998 | Lu | 370/223 |
| 6,298,043 B1 | * | 10/2001 | Mauger et al. | 370/248 |
| 6,487,216 B1 | * | 11/2002 | Thompson et al. | 370/466 |
| 6,760,339 B1 | * | 7/2004 | Noel et al. | 370/401 |

FOREIGN PATENT DOCUMENTS

JP  59204338  11/1984

* cited by examiner

Primary Examiner—Hassan Kizou
Assistant Examiner—Ahmed Elallam
(74) Attorney, Agent, or Firm—Katten Muchin Rosenman LLP

(57) ABSTRACT

An intensive management apparatus for managing a time-sharing multiplexing network, comprises: a path-information-creating unit for creating path information including a group identifier, termination information of terminating connection points, a path management number assigned to a path connecting the terminating connection points at which time slots in a communication apparatus are allocated and an allocated-time-slot number; a time-slot-allocating unit for creating time-slot-allocation information describing allocation of the time slots to a path identified by the path management number included in the time-slot-allocation information for each of the terminating connection points; a path-information-checking unit for forming a judgment on validity of each of a plurality of paths identified by the same group identifier assigned to a path-information group comprising pieces of path information describing the paths on the basis of the path information; and a result display unit for displaying results of the judgment on validity of the paths.

9 Claims, 27 Drawing Sheets

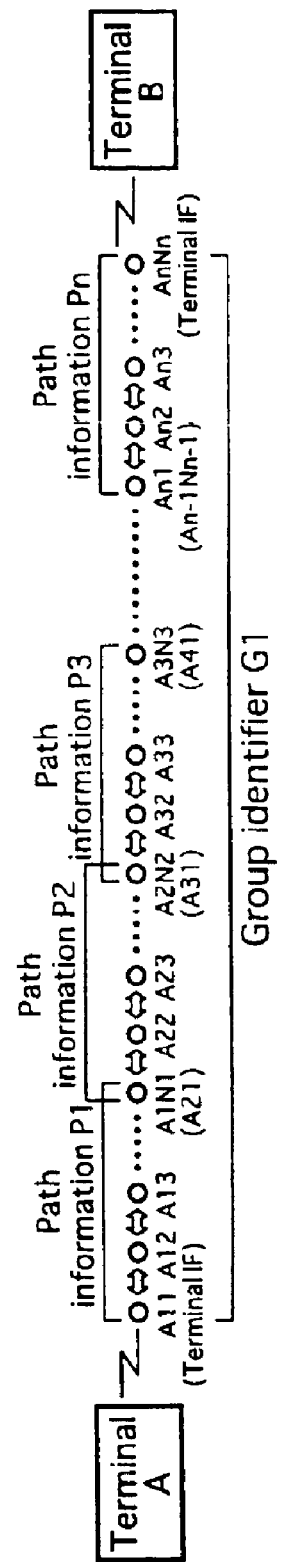

FIG. 5

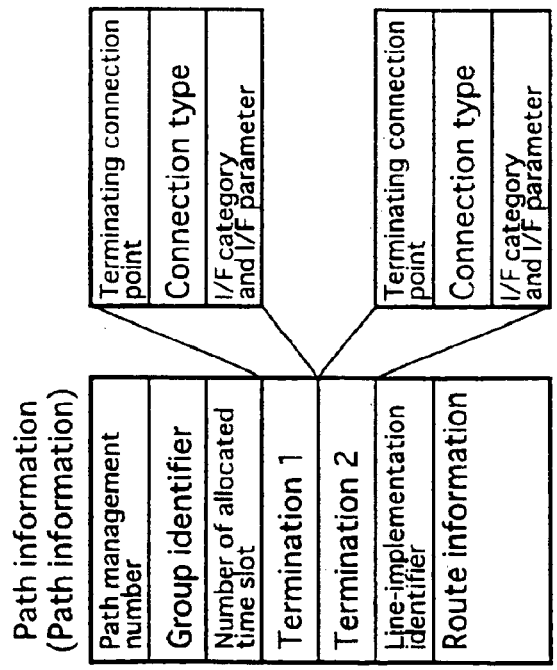

Path information
  : Path management number
    : Management number for identifying path information
  Group identifier
    : Identifier for identifying a group comprising pieces of path information
  Number of allocated time slots
    : Width of allocation of time slots to the path(Transmission speed)
  Termination information
    : Information on termination of the path(on both sides)
  Terminating connection point
    : Position of a point serving as a termination of the path
  Connection type
    : Type of a point serving as a termination of the path
      (Terminal IF, apparatus internal IF or transmission IF)
  I/F category
    : Category of the terminal-IF connection type
  Line-implementation identifier
    : Direction of the path(Bi-directional, terminating connection point of
      termination information 1 → terminating connection point of termination
      information 2, terminating connection point of termination information
      2 → terminating connection point of termination information 1)
  Route information
    : Group of terminating connection points from the
      terminating connection point of termination information 1 to the
      terminating connection point of termination information 2 including
      relaying terminating connection points

FIG. 7

Information on allocation of time slots
(Provided on transmission and reception sides of each terminating connection point)

| Allocation information TS#1 | Usage information #1 | Path management number |
|---|---|---|
| Allocation information TS#2 | Usage information #2 | Group identifier |
| ⋮ | ⋮ | |
| Allocation information TS#n | Usage information #m | |

Allocation information TS#n : Allocation information set at TS#n
(n is a maximum number of time slots settable at the terminating connection point)

Usage information #m : The path management number of the path using the TS and a group identifier identifying a group including the path
(As many pieces of usage information as paths using the TS are provided)

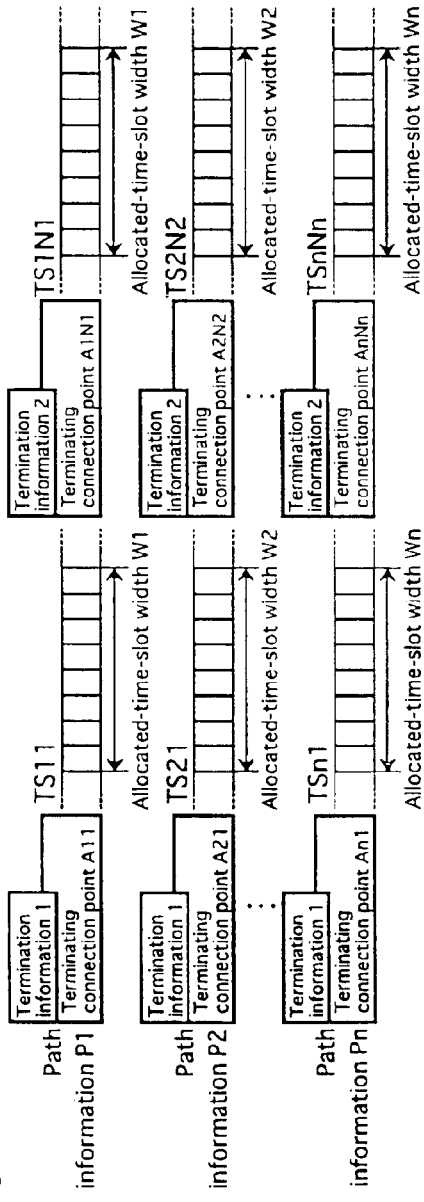
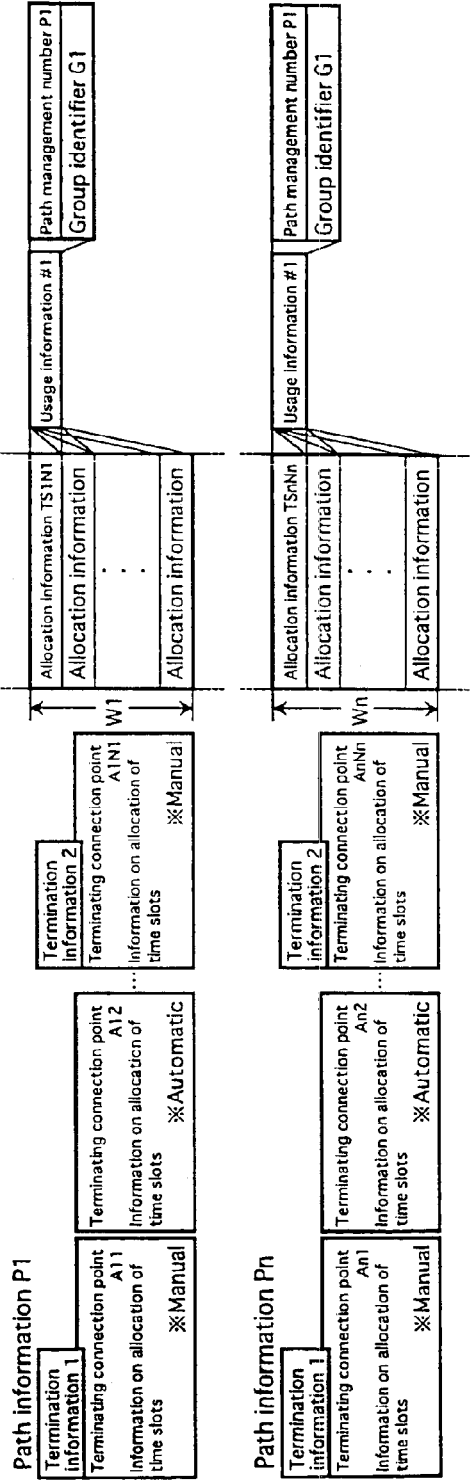

FIG. 10

| Path P11 |
|---|
| P11 |
| G1 |
| TS1 |
| S11<br>Terminal IF |
| X1<br>Apparatus internal IF |
| Bi-directional |

| Path P12 |
|---|
| P12 |
| G1 |
| TS2 |
| X1<br>Apparatus internal IF |
| L13<br>Apparatus internal IF |
| Bi-directional |

| Path P13 |
|---|
| P13 |
| G1 |
| TS3 |
| L13<br>Apparatus internal IF |
| LN1<br>Transmission-line IF |
| Bi-directional |

| Path P14 |
|---|
| P14 |
| G1 |
| TS4 |
| LN1<br>Transmission-line IF |
| L21<br>Apparatus internal IF |
| Bi-directional |

| Path P15 |
|---|
| P15 |
| G1 |
| TS5 |
| L21<br>Apparatus internal IF |
| X2<br>Apparatus internal IF |
| Bi-directional |

| Path P16 |
|---|
| P16 |
| G1 |
| TS6 |
| X2<br>Apparatus internal IF |
| S21<br>Terminal IF |
| Bi-directional |

FIG. 11
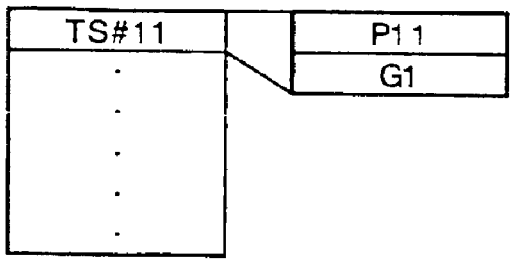
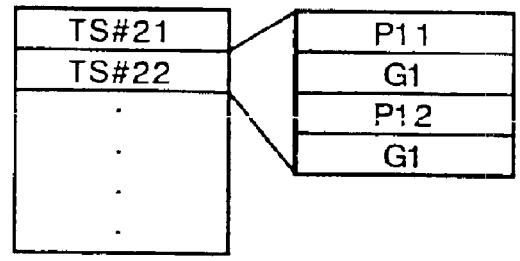
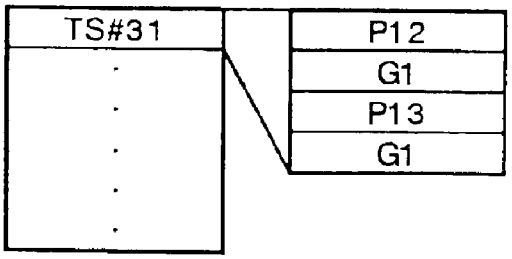
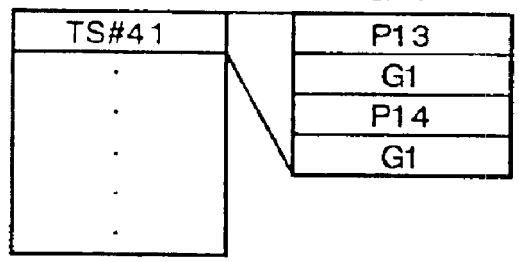
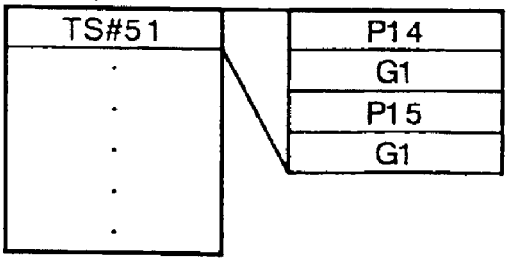
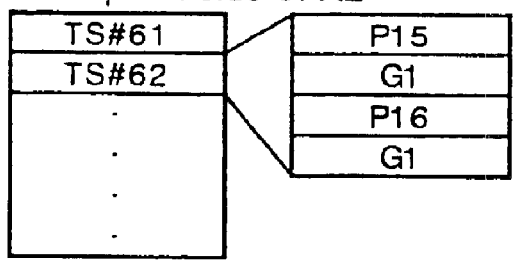
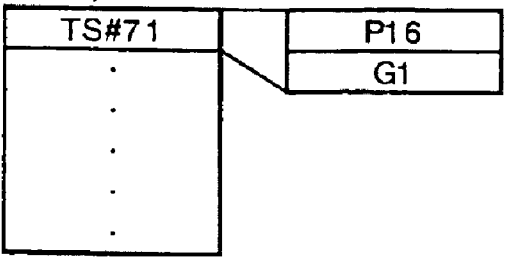

F I G. 1 2
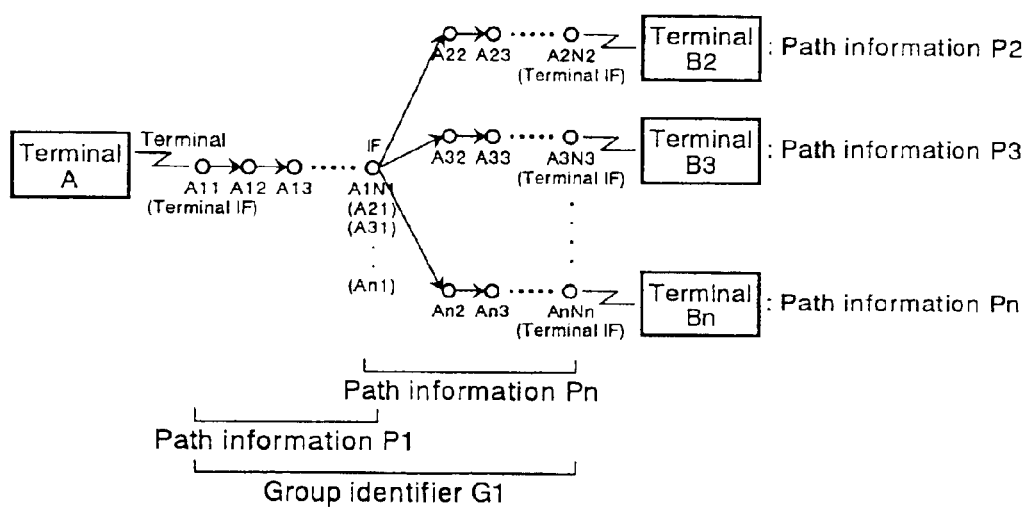

FIG. 14

Path P21

| P21 |
|---|
| G2 |
| TS |
| S12<br>Terminal IF |
| X1<br>Apparatus internal IF |
| Uni-directional |

Path P22

| P22 |
|---|
| G2 |
| TS |
| X1<br>Apparatus internal IF |
| L13<br>Apparatus internal IF |
| Uni-directional |

Path P23

| P23 |
|---|
| G2 |
| TS |
| L13<br>Apparatus internal IF |
| LN1<br>Transmission-line IF |
| Uni-directional |

Path P24

| P24 |
|---|
| G2 |
| TS |
| LN1<br>Transmission-line IF |
| L21<br>Apparatus internal IF |
| Uni-directional |

Path P25

| P25 |
|---|
| G2 |
| TS |
| L21<br>Apparatus internal IF |
| X2<br>Apparatus internal IF |
| Uni-directional |

Path P261

| P261 |
|---|
| G2 |
| TS |
| X2<br>Apparatus internal IF |
| S21<br>Terminal IF |
| Uni-directional |

Path P262

| P262 |
|---|
| G2 |
| TS |
| X2<br>Apparatus internal IF |
| S22<br>Terminal IF |
| Uni-directional |

FIG. 15
Transmission side of S12
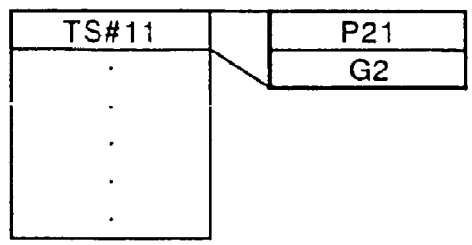
Transmission side of X1
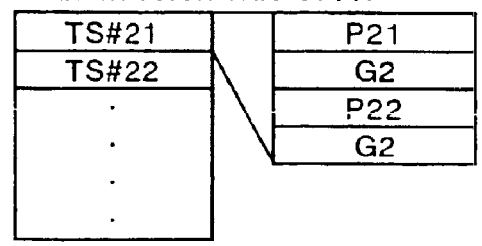
Transmission side of L13
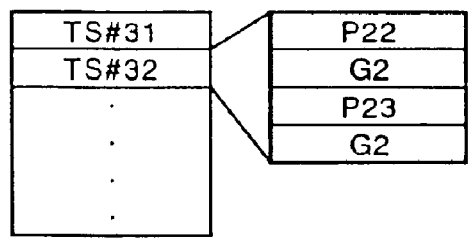
Transmission side of LN1
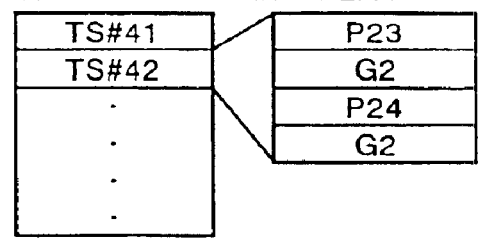
Reception side of L21
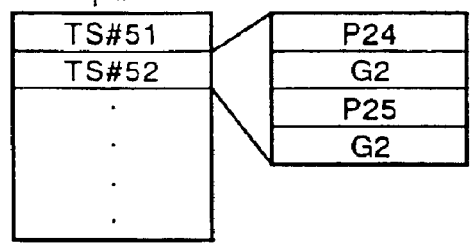
Reception side of X2
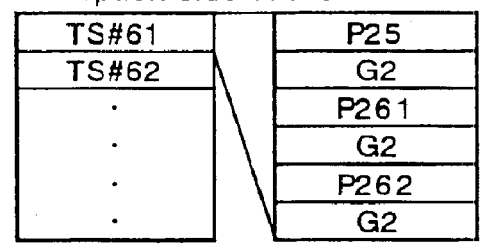
Reception side of S21
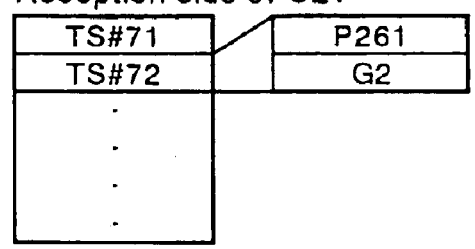
Reception side of S22
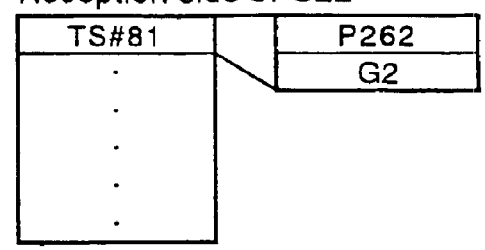

Transmission side of X1

Information on allocation of time slots at the terminating connection point A14

INTENSIVE MANAGEMENT APPARATUS FOR CHECKING PATH VALIDITY IN TIME-SHARING MULTIPLEXING NETWORK

BACKGROUND OF THE INVENTION

1. Field of the Invention

In general, the present invention relates to an intensive management apparatus for managing a time-sharing multiplexing network. More particularly, the present invention relates to an intensive management apparatus for checking validity of paths in a time-sharing multiplexing network.

2. Description of the Related Art

In many cases, a network used in an enterprise or the like is implemented by a time-sharing multiplexing network such as an SDH (Synchronous Digital Hierarchy) network. A time-sharing multiplexing network is a network in which a frame is transmitted through a plurality of time slots each allocated to transmitted data. A time-sharing multiplexing network is composed of a plurality of terminals, a plurality of communication apparatuses and transmission lines connecting the communication apparatuses to each other. A terminal is typically a personal computer accommodated by a communication apparatus directly or through a multiplexing apparatus or the like. By means of a cross-connect unit and in accordance with line-setting information, a communication apparatus outputs transmitted data to a transmission line by mapping the data onto time slots allocated to the communication apparatus and the transmission line. The line-setting information is information on time slots used for cross-connecting and multiplexing transmitted data mapped onto the time slots allocated to the communication apparatus and the transmission line.

FIG. 27 is a diagram showing typical paths from a terminal to another terminal. Assume, for example, that paths are set between a terminal 2#11 accommodated by a communication apparatus 12#1 to a terminal 2#21 accommodated by a communication apparatus 12#2. As shown in the figure, the communication apparatus 12#i, where i=1 and 2, comprises a terminal IF unit 14#ij where j=1, 2 and so on, an external IF unit 16#i, a multiplexing unit 18#i, a cross-connect unit 20#i and a transmission-line IF unit 22#ij. A connection point is a conceptual point in the connection between 2 units such as a multiplexing unit 18#i and a cross-connect unit 20#i. At the connection point between 2 units, time slots are allocated to data transmitted between the 2 units. In a communication apparatus 12#i shown in FIG. 27, a symbol Sij denotes a connection point between a terminal IF unit 14#ij and a multiplexing unit 18#i, a symbol Xi denotes a connection point between a multiplexing unit 18#i and a cross-connect unit 20#i, a symbol Lij denotes a connection point between a cross-connect 20#i and a transmission-line IF unit 22#ij and a symbol LN1 denotes a connection point of a transmission line 24#12 between transmission-line IF units 22#ij. In an external interface apparatus 4#i, a symbol CXi denotes a connection point between a multiplexing unit 8#i and an external IF unit 10#i whereas a symbol CSij denotes a connection point between a multiplexing unit 8#i and a terminal IF unit 6#ij.

In order to allow paths between terminals to be set, paths are modified or subjected to other operations with a high degree of flexibility in a time-sharing multiplexing network. The paths each finely set between connection points are connected to allow a route to be configured as a whole between the terminals. For example, a route can be set between the terminals 2#11 and 2#21 by formation of path information P1 describing a path connecting the connection point S11 to the connection point X1, path information P2 describing a path connecting the connection point X1 to the connection point X2 and path information P3 describing a path connecting the connection point X2 to the connection point S21. A person in charge of system management sets information on allocation of time slots at all connection points included in the 3 pieces of path information P1, P2 and P3 in the intensive management apparatus. The intensive management apparatus generates information on line setting based on the information on allocation of time slots. The intensive management apparatus carries out line setting by downloading the information on line setting to the communication apparatuses 12#i. In the conventional time-sharing multiplexing network, however, the following problems are encountered.

(1) The width W2 of allocation of time slots in path information P2 describing a path between the terminating connection points X1 and X2 is different from the width W1 of allocation of time slots in path information P1 between the terminating connection points S11 and X1, that is, W2≠W1. In this case, at a connection point X1 of a communication apparatus 12#1, there is a discrepancy in time-slot-allocation width. Assume that W1>W2. In this case, data transmitted from the terminal 2#11 at a transmission rate corresponding to the width W1 of allocation of time slots is transmitted by the cross-connect unit 20#i at a transmission rate corresponding to the width W2 of allocation of time slots so that the transmitted data is inadvertently destroyed. As a result, an abnormality is generated in the transmitted data between the terminals 2#11 and 2#21.

(2) If the position of an allocated time slot used in the path information P1 is shifted from the position of an allocated time slot used in the path information P2, there will be a discrepancy in time-slot-allocation position at the connection point X1 in the communication apparatus 12#1. The cross-connect unit 20#i allocates a route to transmitted data mapped onto a time slot at the position of the allocated time slot allocated to the path described by the path information P1. Thus, if the position of an allocated time slot allocated to the path described by the path information P1 is different from the position of an allocated time slot allocated to the path described by the path information P2, the data transmitted by the terminal 2#11 and mapped onto the time slot at the position of the allocated time slot at the connection point X1 allocated to the path described by the path information P1 cannot be subjected to route allocation to a time slot at the position of an allocated time slot at the connection point X1 allocated to the path described by the path information P2. As a result, an abnormality is generated in the transmitted data between the terminals 2#11 and 2#21.

(3) If a link of pieces of information on paths between the terminals 2#11 and 2#21 is broken, it is not possible to establish a communication between the terminals 2#11 and 2#21. Likewise, when a path is set between the terminals 2#11 and 2#22, information-on a path between the connection points X2 and S23 may not be set due to a mistake made by the person in charge of network management. In this case, an abnormality is generated between the terminals 2#11 and 2#22.

(4) If the terminal-I/F category of the terminal-IF connection type of the terminal IF unit 14#11 is different from the terminal-I/F category of the terminal-IF connection type of the terminal IF unit 14#21, an abnormality is unavoidably generated between the terminals 2#11 and 2#21.

If information defining a sequence of lines is formed as information on paths, which is split by a plurality of connection points, as described above, each information on a path is managed as independent path information. A plurality of pieces of path information is then connected to each other to form single path information and the validity of the single path information is checked. Otherwise, the operation of the system will be started inevitably by using incorrect information defining lines.

It is thus an object of the present invention to provide an intensive management apparatus capable of preventing the operation of the system from being started on the basis of incorrect information defining lines by connecting a plurality of pieces of information on a path to each other to form single path information and checking the validity of the single path information when forming the single path information from the pieces of information on a path.

SUMMARY OF THE INVENTION

In accordance with an aspect of the present invention, there is provided an intensive management apparatus for managing a time-sharing multiplexing network including: a plurality of terminals; a plurality of communication apparatuses each for communicating transmitted data accommodated in each of time slots by mapping the transmitted data onto the time slots allocated to a transmission line and allocated in the communication apparatus for transmitting the transmitted data on the basis of line-setting information; and a plurality of transmission lines connecting the communication apparatuses to each other, the intensive management apparatus comprising: a path-information-creating unit for creating path information including a group identifier, termination information of connection points, a path management number assigned to a path connecting the connection points at which the time slots in the communication apparatus are allocated and an allocated-time-slot number; a time-slot-allocating unit for creating time-slot-allocation information describing allocation of the time slots to a path identified by the path management number included in the time-slot-allocation information at each of the connection points; a path-information-checking unit for forming a judgment on validity of each of a plurality of paths identified by the same value of the group identifier assigned to a path-information group comprising pieces of path information describing the paths on the basis of the path information; and a result display unit for displaying results of the judgment on validity of the paths.

The present and other objects, features and advantages of the present invention as well as the manner of realizing them will become more apparent, whereas the invention itself will be best understood from a study of the following description and appended claims with reference to attached drawings showing some preferred embodiments of the invention.

BRIEF DESCRIPTION OF THE DRAWINGS

FIG. 4 is a diagram showing general paths;

FIG. 5 is a diagram showing information on a path;

FIG. 7 is a diagram showing information on allocation of time slots;

FIG. 8A is a diagram showing an image of allocation of time slots;

FIG. 8B is a diagram showing information on allocation of time slots;

FIG. 10 is a diagram showing information on the paths shown in FIG. 9;

FIG. 11 is a diagram showing information on allocation of time slots to the paths shown in FIG. 9;

FIG. 12 is a diagram showing paths used in general broadcasting;

FIG. 14 is a diagram showing pieces of information on the paths shown in FIG. 13;

FIG. 15 is a diagram showing information on allocation of time slots to the paths shown in FIG. 13;

DETAILED DESCRIPTION OF THE PREFERRED EMBODIMENTS

Figure 1:
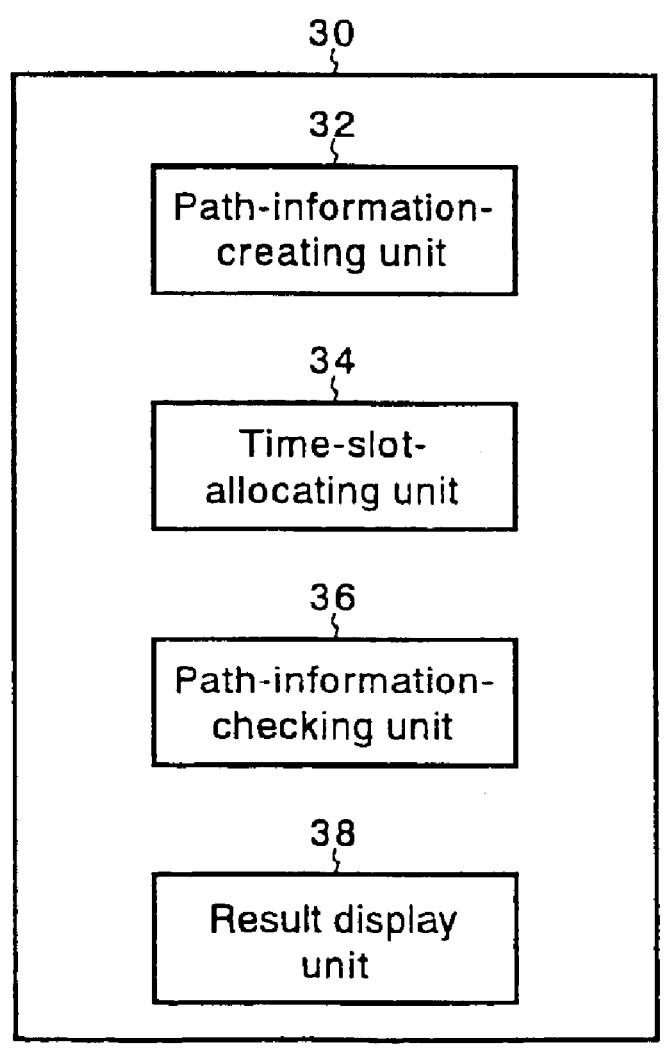
FIG. 1 is a diagram showing the principle of the present invention.

Before describing preferred embodiments of the present invention, the principle of the present invention is explained. FIG. 1 is a diagram showing the principle of the present invention. As shown in FIG. 1, an intensive management apparatus 30 comprises a path-information-creating unit 32, a time-slot-allocating unit 34, a path-information-checking unit 36 and a result display unit 38. The path-information-creating unit 32 creates path information including a group identifier, termination information on connection points, a path management number assigned to a path connecting the connection points at which the time slots in the communication apparatus are allocated and the number of allocated time slots, which is also referred to hereafter as an allocated-time-slot number. The same group identifier is assigned to a plurality of paths constituting a route from a terminal to another. The path management number is a number for identifying a path. Also referred to as a band or an allocated-time-slot number, the number of allocated time slots is the number of time slots allocated to a path. A connection point is a point at which time slots are allocated in a communication apparatus or to a transmission line. Time slots are allocated at a connection point. The time-slot-allocating unit 34 creates time-slot-allocation information including the path management number of each path to which time slots are allocated. The information on allocation of time slots is provided for each connection point and such a path management number is included for each allocated time slot.

The path-information-checking unit 36 forms a judgment on validity of a plurality of paths identified by a common group identifier assigned to a path-information group composed of the paths on the basis of the path information for each of the paths. Examples of the judgment on the validity of a plurality of paths are a judgment as to whether or not the width of allocation of time slots is uniform for the path information group and a judgment as to whether or not the position of a time slot allocated to a first path at a connection point matches the position of a time slot allocated to a second path sharing the connection point. The result display unit 38 displays an outcome of a judgment on validity of paths. As a result, since any error detected in a path information group is displayed, the person in charge of network management is capable of correcting the error before line setting information is downloaded into a communication apparatus.

Figure 2:
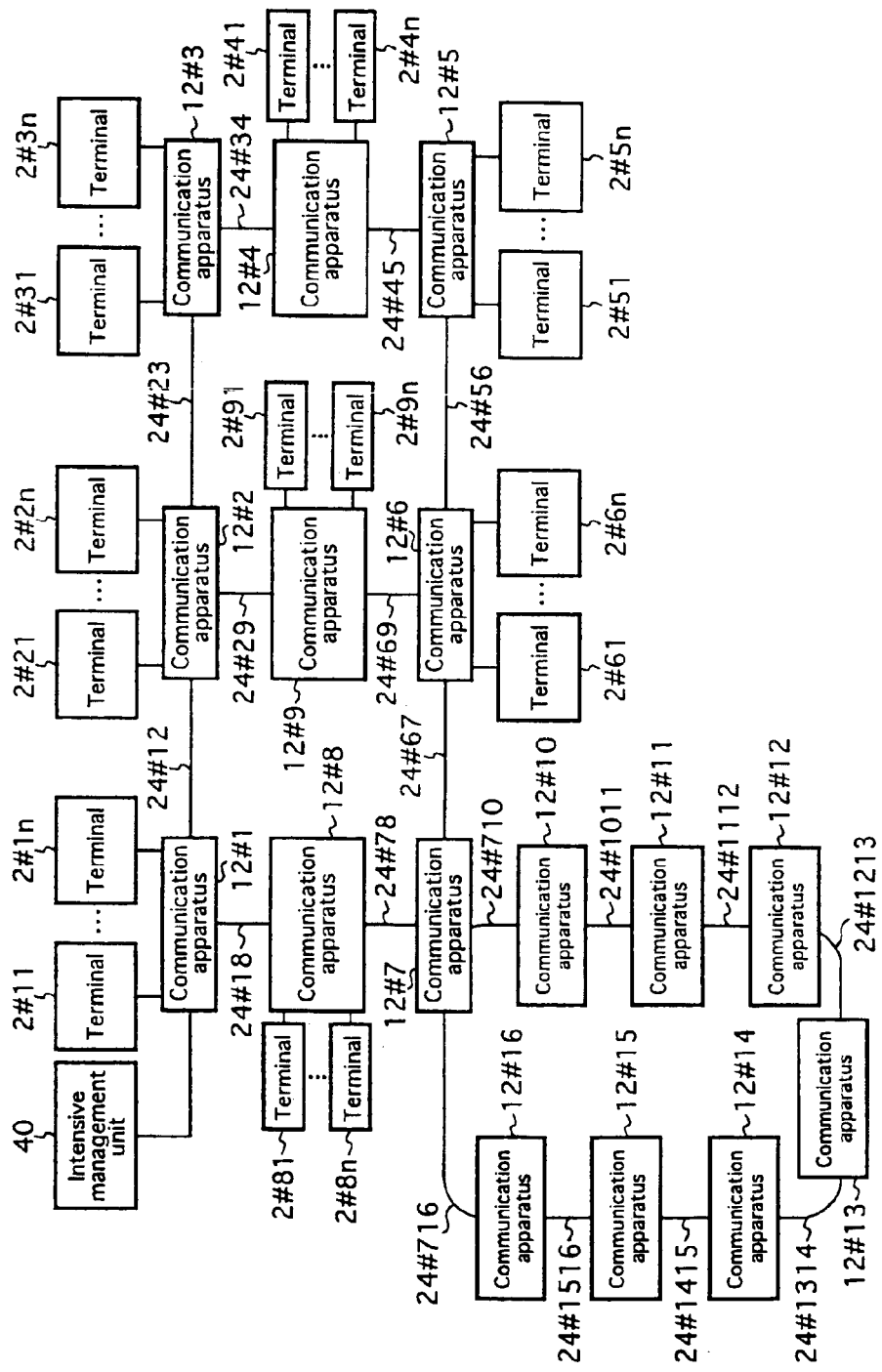
FIG. 2 is a diagram showing a typical configuration of a time-sharing multiplexing network implemented by an embodiment of the present invention.
Figure 27:
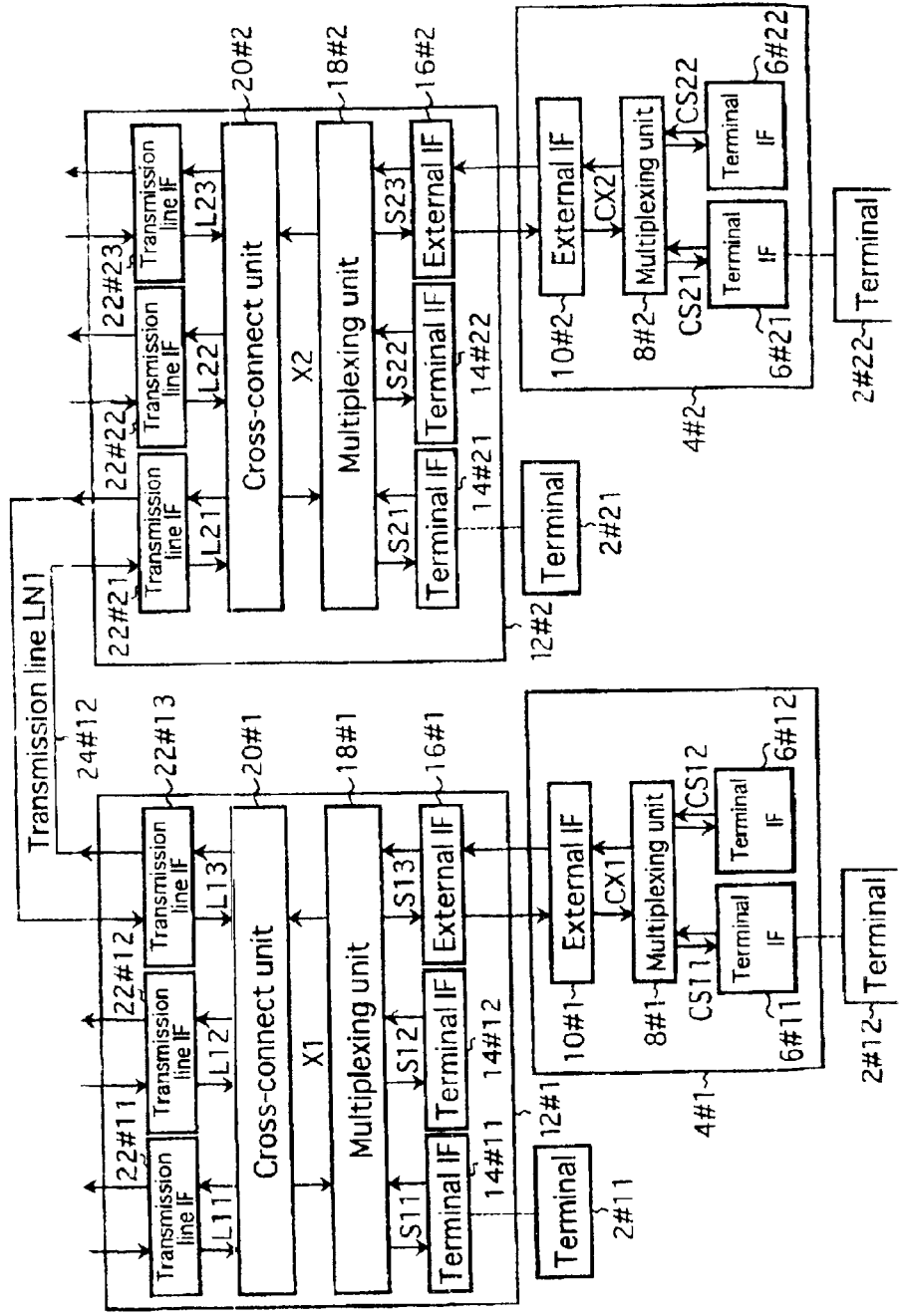
FIG. 27 is a diagram showing typical paths.

FIG. 2 is a diagram showing a typical configuration of a time-sharing multiplexing network implemented by an embodiment of the present invention. The time-sharing multiplexing network shown in FIG. 2 comprises a plurality of communication apparatuses 12#i forming a mesh where i=1 to 9, a plurality of communication apparatuses 12#i where i=10 to 16 with the communication apparatus 12#7 serving as a relay apparatus between the communication apparatuses 12#i where i=1 to 9 and the communication apparatuses 12#i where i=10 to 16, transmission lines 24#ij each connecting the communication apparatus 12#i to the communication apparatus 12#j, a plurality of terminals 2#ij accommodated by the communication apparatus 12#i where j=1 to n, external interface apparatuses accommodated by the communication apparatus 12#i, terminals accommodated by the external interface apparatuses (not shown) and an intensive management apparatus 40. The configuration of the time-sharing multiplexing network implemented by the embodiment as shown in FIG. 2 is no more than a typical configuration. In other words, it is needless to say that the configuration of the time-sharing multiplexing network is not limited to the embodiment. The configuration of the communication apparatus 12#i is essentially the same as that shown in FIG. 27. The intensive management apparatus 40 has the following functions:

(1) Input information on a path entered by the person in charge of network management and create a path information file.
(2) Input information on allocation of time slots entered by the person in charge of network management and create a time-slot-allocation-information file.
(3) Check the validity of information on a path and information on allocation of time slots in accordance with a command issued by the person in charge of network management.
(4) Display results of validity checking.
(5) Correct information on a path and information on allocation of time slots in accordance with a command issued by the person in charge of network management.
(6) Generate line setting information in accordance with information on a path and information on allocation of time slots and download the line setting information to the communication apparatuses 12#i.

Figure 3:
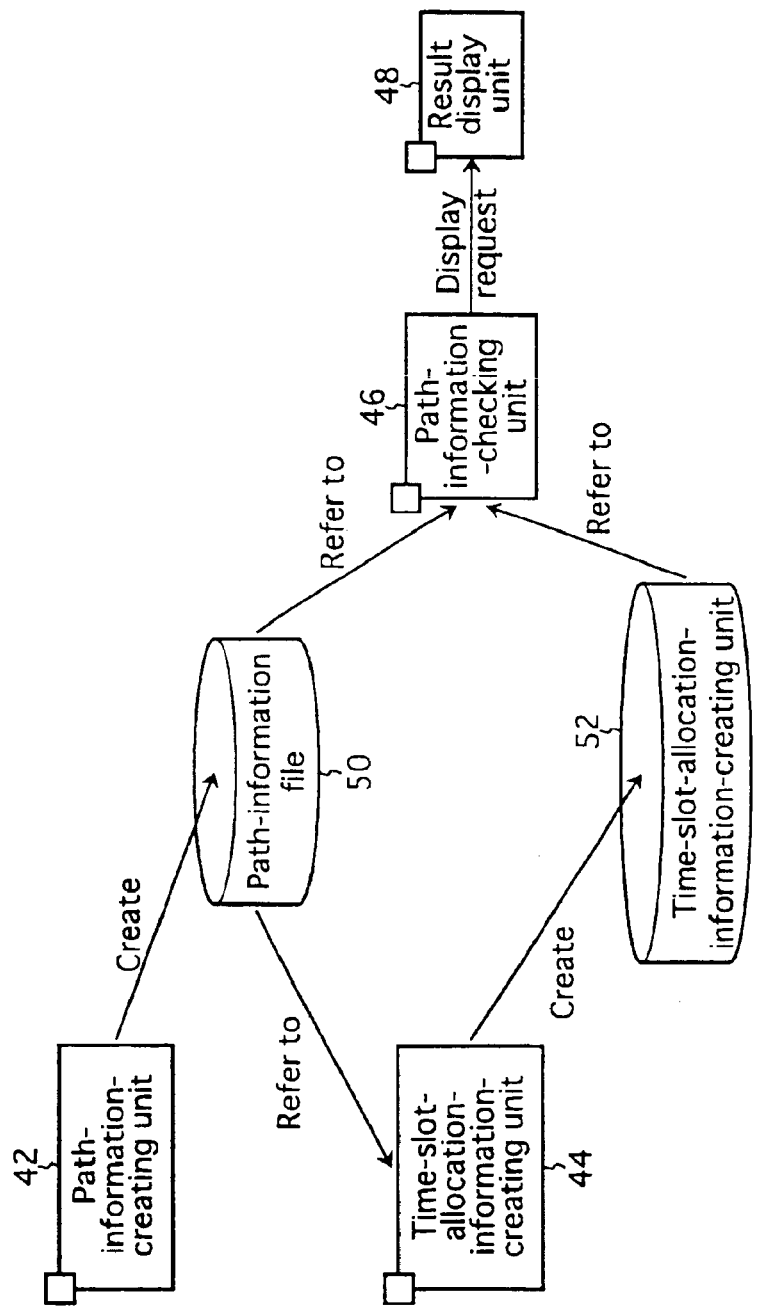
FIG. 3 is a diagram showing the configuration of an intensive management apparatus for controlling the time-sharing multiplexing network shown in FIG. 2.

FIG. 3 is a diagram showing the configuration of the intensive management apparatus 40 for controlling the time-sharing multiplexing network shown in FIG. 2. As shown in FIG. 3, the intensive management apparatus 40 comprises a path-information-creating unit 42, a time-slot-allocation-information-creating unit 44, a path-information-checking unit 46, a result display unit 48, a path-information file 50 and a time-slot-allocation-information file 52.

FIG. 4 is a diagram showing a general path set between terminals A and B. The path between the terminals A and B is obtained as a result of connecting a plurality of paths described by pieces of path information P1 to Pn. Indicated by notation A11 ⇔ A12 ⇔ A13 . . . ⇔ A1N1, the path information P1 is information on a path connecting a terminating connection point A11 having a terminal-IF connection type to a terminating connection point A1N1. Likewise, indicated by notation A1N1 ⇔ A22 ⇔ A23 . . . ⇔ A2N2, the path information P2 is information on a path connecting a terminating connection point A21 serving also as the connection point A1N1 of the path information P1 to a terminating connection point A2N2. A terminating connection point is a connection point at an end of a path. A connection type will be described later.

In general, the path information Pi, where i=2 to n, connects a terminating connection point also serving as a terminating connection point of the path information Pi-1 to another terminating connection point. A group identifier G1 is a common identifier assigned to the pieces of path information Pi where i=1 to n. The group identifier G1 indicates that the pieces of path information Pi are used together for setting a complete path between the terminals A and B. The person in charge of network management enters the group identifier along with the pieces of path information Pi. Path information can be used in any arbitrary ways in setting a complete path between the terminals A and B. For example, a piece of path information Pi can be split into finer pieces of path information. Reversely, a plurality of pieces of path information Pi can be integrated into a single piece of path information. FIG. 5 is a diagram showing information on a path. As shown in FIG. 5, information on a path includes a path management number, a group identifier, the number of allocated time slots, termination information 1, termination information 2, a line-implementation identifier and information on a route. Assigned to information on a path for uniquely identifying the information on a path, the path management number is a number unique in the time-sharing multiplexing network. The group identifier is a number used for grouping pieces of path information. To put it in detail, the group identifier is used for indicating that a single path between terminals A and B has been formed from a plurality of paths, the pieces of path information of which are put into a path-information group identified by a common group identifier. The number of allocated time slots is the width of allocation of time slots allocated to the path, and the width of allocation of time slots represents a speed of transmission.

Termination information 1 and termination information 2 are information on 2 terminating connection points respectively at both the ends of a path described by the information on a path. Each of termination information 1 and termination information 2 includes a terminating connection point, a connection type, a terminal-I/F category and an I/F parameter. The terminating connection point is a connection point of one end of the path. The connection type is the type of a terminating connection point used as a path termination. Examples of the connection type are a terminal IF, an apparatus internal IF and a transmission-line IF. The terminal-IF type indicates that the terminating connection point is a terminal interface or, to be more specific, the terminal IF unit 6#ij is connected to the terminating connection point. The apparatus-internal-IF type indicates that the terminating connection point is an apparatus internal interface such as an interface between the multiplexing unit 18#i and the cross-connect unit 20#i. The transmission-line-IF type indicates that the terminating connection point is an interface of the transmission line 24#ij for connecting a communication apparatus 12#i to another communication apparatus.

A connection type is set so as to enable checking of validity of a complete path set between the terminals 2#ij, which comprises a plurality of paths identified by the same plurality of pieces of path information put into a path-information group identified by a group identifier. If the connection type is a terminal IF, a terminal-I/F category and an I/F parameter need to be described. A terminal-I/F category specifies the name of the terminal-IF connection type such as Ethernet or G703. An I/F parameter is a parameter of the terminal-IF connection type such as information on the clock signal. The reason why a terminal-I/F category and an I/F parameter are set is that, if the terminal-I/F category and the I/F parameter of the terminal A do not match the terminal-I/F category and the I/F parameter of the terminal B, data cannot be exchanged between the terminals. By verifying that the terminal-I/F category and the I/F parameter, which are associated with the terminal IF and the connection point in termination information for the terminal A, match the terminal-I/F category and the I/F parameter, which are associated with the terminal IF and the connection point in termination information for the terminal B, it is possible to prevent an abnormality of transmitted data from being generated due to mismatching of the terminal-I/F categories and the I/F parameters.

The line-implementation identifier is used for identifying the direction of the path between the connection points indicated by termination information 1 and the connection point indicated by termination information 2. In the case of a bi-directional path, for example, the following identifier is used: Termination information 1→Termination information 2 and Termination information 2→Termination information 1. The route information is information on a group of connection points relaying transmitted information from the connection point indicated by termination information 1 to the connection point indicated by termination information 2.

The intensive management apparatus 40 generates information on allocation of time slots for each of the connection points Ai2 to AiNi-1 serving as a relay by using information on allocation of time slots for each of the connection points Ai1 to AiNi as a base.

Figure 6A:
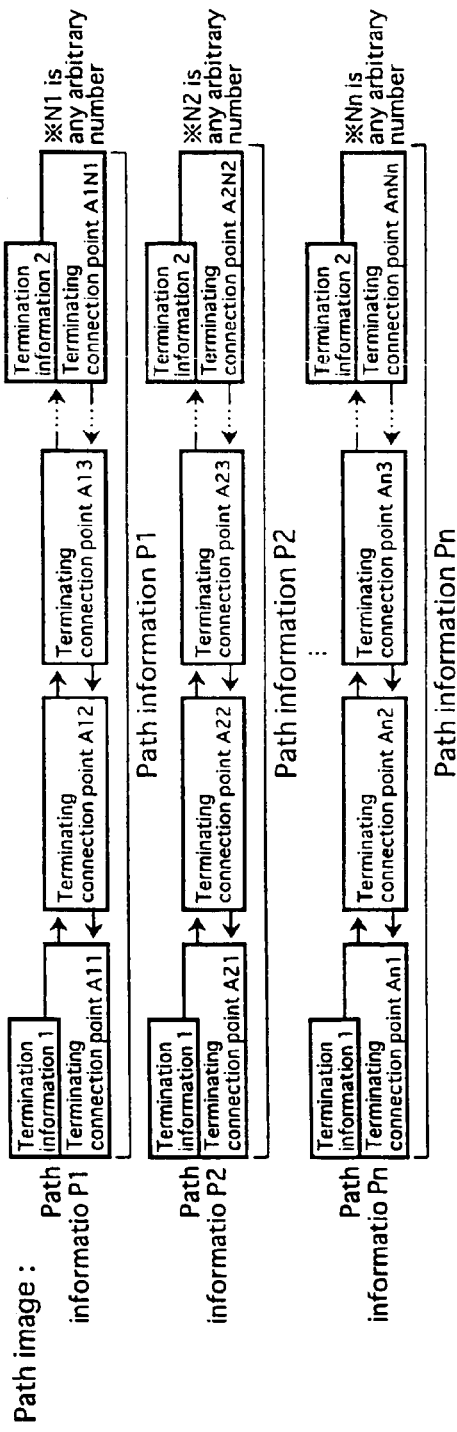
FIG. 6A is a diagram showing a path image.
Figure 6B:
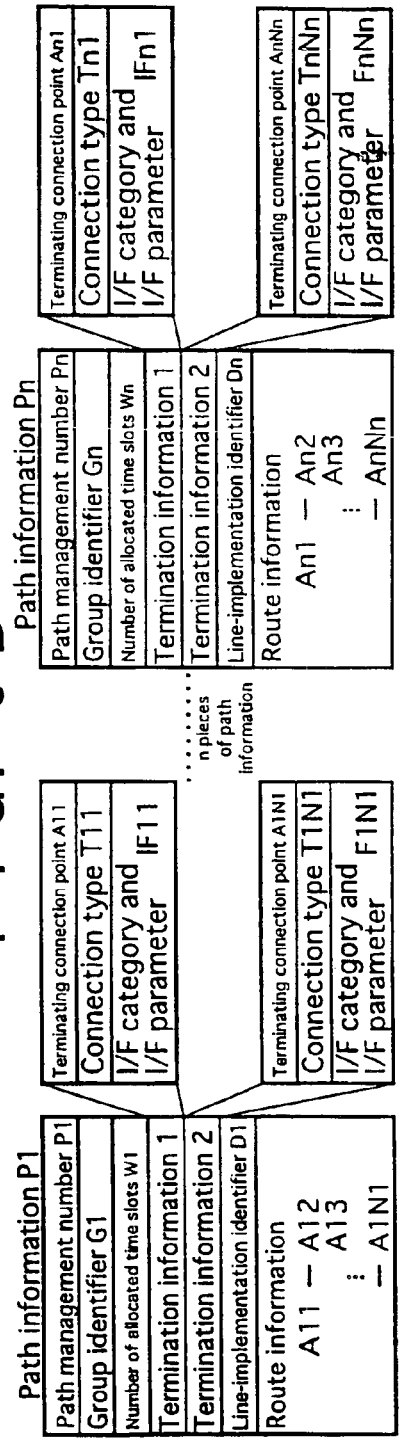
FIG. 6B is a diagram showing information on paths.

FIG. 6A is a diagram showing a path image. FIG. 6B is a diagram showing information on paths. As shown in FIG. 6A, each of the pieces of path information Pi shown in FIG. 4, where i=1 to n, has the terminating connection point Ai1 described in termination information 1, the terminating connection point AiNi described in termination information 2 and the relaying connection points Ai2 to AiNi-1 between the connection point Ai1 and the connection point AiNi.

Each of the n pieces of path information shown in FIG. 6A, namely, path information P1 to path information Pn, has a format shown in FIG. 6B. For example, the path information P1 includes a path management number P1, a group identifier G1, an allocated-time-slot number W1, termination information 1, termination information 2, a line-implementation identifier D1 indicating a bi-directional line and information on a route. Termination information 1 includes a terminating connection point A11, a connection type T11 indicating a terminal IF, a terminal-I/F category IF11 and an I/F parameter. Similarly, termination information 2 includes a terminating connection point A1N1, a connection type T1N1 indicating an apparatus internal IF, a terminal-I/F category IF1N1 and an I/F parameter. The information on a route is A11 ⇔ A12 ⇔ A13 ⇔ ... ⇔ A1N1. By the same token, the path information Pn includes a path management number Pn, a group identifier G1, an allocated-time-slot number Wn, termination information 1, termination information 2, a line-implementation identifier Dn indicating a bi-directional line and information on a route. Termination information 1 includes a terminating connection point An1, a connection type Tn1, a terminal-I/F category IFn1 and an I/F parameter. Similarly, termination information 2 includes a terminating connection point AnNn, a connection type TnNn, a terminal-I/F category IFnNn and an I/F parameter. The information on a route is An1⇔ An2 ⇔ An3 ⇔ ... ⇔ AnNn.

FIG. 7 is a diagram showing information on allocation of time slots. As described in FIG. 7, the information on allocation of time slots is provided on both the transmission and reception sides of each connection point set in information on a path. Take a connection point between 2 units, namely, first and second units such as the multiplexing unit 18#i and the cross-connect unit 20#i as an example. The transmission side of the connection point corresponds to the direction of transmission from the first unit to the second unit while the reception side of the connection point corresponds to the direction of transmission from the second unit to the first unit. The information on allocation of time slots comprises pieces of allocation information TS#1, TS#2, ... and TS#n, which are each associated with a time slot. The suffix n is a maximum number of time slots settable for the connection point for which the information on allocation of time slots is provided. Each of the pieces of allocation information TS#i where i=1 to n comprises pieces of usage information #i1, #i2 and so on. Each of the pieces of usage information #im is associated with path information that describes a path to which the corresponding time slot is allocated at a connection point provided with this information on allocation of time slots TS#i. That is to say, each piece of usage information #im includes the path management number identifying the path (or the information on the path) and the group identifier identifying the path-information group including the information on the path. If a time slot corresponding to the allocation information TS#i is allocated to a plurality of pieces of path information, the same plurality of pieces of usage information #im is included in the allocation information TS#i.

FIG. 8A is a diagram showing an image of allocation of time slots. FIG. 8B is a diagram showing information on allocation of time slots. As shown in FIG. 6B, each path information Pi where i=1 to n includes an allocated-time-slot number W1 and termination information 1 describing a terminating connection point Ai1. As shown in FIG. 8A, the transmission and/or a reception side of each connection Ai1 is associated with a time-slot-allocation positions TSi1 having a range corresponding to the allocated-time-slot number W1. The time-slot-allocation positions TSi1 correspond to the information on allocation of time slots shown in FIG. 7 and provided for the transmission and/or a reception side of each connection point. To be more specific, each time-slot-allocation position corresponds to a piece of allocation information shown in FIG. 7. The positions of time-slots allocated to a path are not necessarily uniform throughout the path information Pi describing the path. In path information Pi describing a path passing through a cross-connect unit, for example, the positions of time slot allocated at a terminating connection point described in termination information 1 do not have to be the same as the positions of time slots allocated at a terminating connection point described in termination information 2. This is because the cross-connect unit is capable of mapping transmitted data mapped on any time slot onto the position of any other arbitrary time slot. Information on allocation of time slots, which is associated with the path information Pi shown in FIG. 8A, is created for each of the terminating connection point Ai1 described in termination information 1, the terminating connection point AiNi described in termination information 2 and the relaying connection points Aij each for relaying data from the connection point Ai1 described in termination information 1 to the connection point AiNi described in termination information 2 where j=2 to Ni-1. The information on allocation of time slots for each of the relaying connection points Aij, where j=2 to Ni-1, described in the route information of the path information Pi and used for relaying data as described above, is created automatically by the intensive management apparatus 40 by using the information on allocation of time slots created for the terminating connection point Ai1 described in termination information 1 and the information on allocation of time slots created for the terminating connection point AiNi described in termination information 2 as a base. In addition, if the line-implementation identifier included in the path information Pi indicates that the path is a bi-directional line, information on allocation of time slots is created on each of the transmission and reception sides of a connection point.

For example, the terminating connection point A11 described in termination information 1 included in the path information P1 is provided with time-slot-allocation positions TS11 shown in FIG. 8A. As described above, the time-slot-allocation positions TS11 correspond to information on allocation of time slots shown FIG. 7. As shown in FIG. 7, the information on allocation of time slots includes pieces of allocation information TS#i, where i=1 to n, each including at least the usage information #1 describing a path management number and a group identifier, which are P1 and G1 respectively in this case. As shown in FIG. 8B, an allocated-time-slot number W1 greater than 1 indicates that there is a plurality of time-slot-allocation positions TS1N1 each corresponding to a piece of allocation information TS#i shown in FIG. 7. In this case, the path management number P1 and the group identifier G1 are set uniformly for the time-slot allocation positions TS1N1 as usage information #1 as shown in FIG. 8B. On the other hand, a path management number Pn and the group identifier G1 are also set uniformly for the time-slot allocation positions TSnNn shown in FIG. 8A as usage information #1 of pieces of allocation information TSnNn.

In addition, the intensive management apparatus 40 allocates as many unused time slots as Wi time slots allocated to a path described by the path information Pi to the transmission and/or reception sides of each of relaying connection points Aij, where j=2 to Ni-1, described in the route information of the path information Pi where the symbol Wi denotes the number of allocated time slots as explained above. The transmission and/or reception sides are determined in dependence on the line-implementation identifier included in the path information Pi. A path management number Pi and the group identifier G1 are set as usage information of pieces of allocation information included in the information on allocation of unused time slots allocated to each of the connection points Aij.

Figure 9:
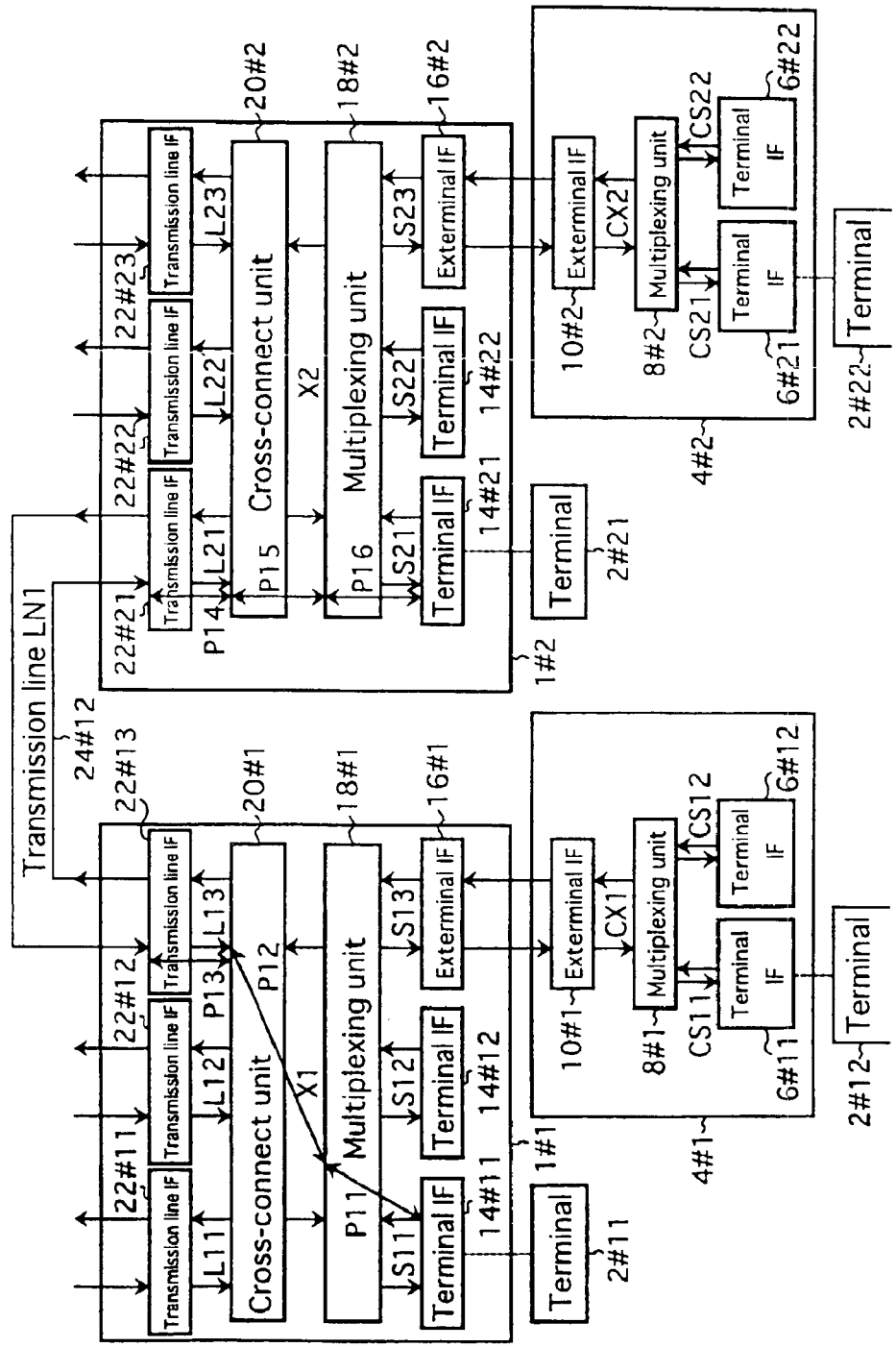
FIG. 9 is a diagram showing actual paths.

FIG. 9 is a diagram showing actual paths between the terminals 2#11 and 2#21 in the time-sharing multiplexing network shown in FIG. 2. As shown in FIG. 9, the paths between the terminals 2#11 and 2#21 are described by path information P11, path information P12, path information P13, path information P14, path information P15 and path information P16. The path information P11 is information on a path between connection points S11 and X1. The path information P12 is information on a path between connection points L13 and X1. The path information P13 is information on a path between connection points L13 and LN1. The path information P14 is information on a path between connection points LN1 and L21. The path information P15 is information on a path between connection points L21 and X2. Finally, the path information P16 is information on a path between connection points X2 and S21.

FIG. 10 is a diagram showing the pieces of path information describing the paths shown in FIG. 9. As shown in FIG. 10, the path information P11 includes a path management number P11, a group identifier G1, an allocated-time-slot number TS1, termination information 1 comprising a terminating connection point S11, a terminal-IF connection type and other data, termination information 2 comprising a terminating connection point X1, an apparatus-internal-IF connection type and other data and a line-implementation identifier indicating a bi-directional line.

The path information P12 includes a path management number P12, a group identifier G1, an allocated-time-slot number TS2, termination information 1 comprising a terminating connection point X1, an apparatus-internal-IF connection type and other data, termination information 2 comprising a terminating connection point L13, an apparatus-internal-IF connection type and other data and a line-implementation identifier indicating a bi-directional line.

The path information P13 includes a path management number P13, a group identifier G1, an allocated-time-slot number TS3, termination information 1 comprising a terminating connection point L13, an apparatus-internal-IF connection type and other data, termination information 2 comprising a terminating connection point LN1, a transmission-line-IF connection type and other data and a line-implementation identifier indicating a bi-directional line.

The path information P14 includes a path management number P14, a group identifier G1, an allocated-time-slot number TS4, termination information 1 comprising a terminating connection point LN1, a transmission-line-IF connection type and other data, termination information 2 comprising a terminating connection point L21, an apparatus-internal-IF connection type and other data and a line-implementation identifier indicating a bi-directional line.

The path information P15 includes a path management number P15, a group identifier G1, an allocated-time-slot number TS5, termination information 1 comprising a terminating connection point L21, an apparatus-internal-IF connection type and other data, termination information 2 comprising a terminating connection point X2, an apparatus-internal-IF connection type and other data and a line-implementation identifier indicating a bi-directional line.

The path information P16 includes a path management number P16, a group identifier G1, an allocated-time-slot number TS6, termination information 1 comprising a terminating connection point X2, an apparatus-internal-IF connection type and other data, termination information 2 comprising a terminating connection point S21, a terminal-IF connection type and other data and a line-implementation identifier indicating a bi-directional line.

FIG. 11 is a diagram showing pieces of information on allocation of time slots to the paths conveying data in a direction from the terminal 2#11 to the terminal 2#21 as shown in FIG. 9. Each of the pieces of information is provided on the transmission side and/or the reception side of a connection point. As shown in FIG. 11, a time-slot-allocation position TS#11 described in the information on allocation of time slots provided on the transmission side of a connection point S11 is allocated to a path identified by the path management number P11 and the group identifier G1. A time-slot-allocation position TS#22 described in the information on allocation of time slots provided on the transmission side of a connection point X1 is allocated to the above path identified by the path management number P11 and the group identifier G1, and to another path identified by the path management number P12 and the group identifier G1.

A time-slot-allocation position TS#31 described in the information on allocation of time slots provided on the transmission side of a connection point L13 is allocated to the above path identified by the path management number P12 and the group identifier G1, and to another path identified by the path management number P13 and the group identifier G1.

A time-slot-allocation position TS#41 described in the information on allocation of time slots provided on the transmission side of a connection point LN1 is allocated to the above path identified by the path management number P13 and the group identifier G1, and to another path identified by the path management number P14 and the group identifier G1.

A time-slot-allocation position TS#51 described in the information on allocation of time slots provided on the reception side of a connection point L21 is allocated to the above path identified by the path management number P14 and the group identifier G1, and to another path identified by the path management number P15 and the group identifier G1.

A time-slot-allocation position TS#62 described in the information on allocation of time slots provided on the reception side of a connection point X2 is allocated to the above path identified by the path management number P15 and the group identifier G1, and to another path identified by the path management number P16 and the group identifier G1.

A time-slot-allocation position TS#71 described in the information on allocation of time slots provided on the reception side of a connection point S21 is allocated to the above path identified by the path management number P16 and the group identifier G1.

It should be noted that paths can be set not only for 1-to-1 transmission from a terminal A to a terminal B, but also for 1-to-N broadcasting from a terminal to N terminals where N>1.

FIG. 12 is a diagram showing paths used in general broadcasting communication from a terminal A to terminals B2 to Bn. As shown in FIG. 12, m paths from the terminal A to the terminals Bi, where i=2 to n and m=1 to n−1, are defined by pieces of path information P1 to Pi where i=2 to n.

The path information P1 includes termination information 1 comprising a terminating connection point A11, a terminal-IF connection type and other data, termination information 2 comprising a terminating connection point A1N1, an apparatus-internal-IF connection type and other data, a line-implementation identifier indicating a uni-directional line and route information of A11→A12→ . . . →A1N1. On the other hand, each path information Pi, where i=2 to n, includes termination information 1 comprising a terminating connection point Ai2, an apparatus-internal-IF connection type and other data, termination information 2 comprising a terminating connection point AiNi, a terminal-IF connection type and other data, a line-implementation identifier indicating a uni-directional line and route information of Ai2→Ai3 3→ . . . →AiNi. The path defined by the path information P1 serves as a partial path common to the paths from the terminal A to the terminals Bi. To put it concretely, the path defined by the path information P1 is split at the terminating connection point A1N1 to remaining paths leading to the terminals Bi. It should be noted that the connection point serving as the split point may vary from destination to destination. For example, the path leading to the terminal B2 may branch from the rest at the connection point A12 while the path leading to the terminal B3 may branch from the rest at the connection point A13.

Figure 13:
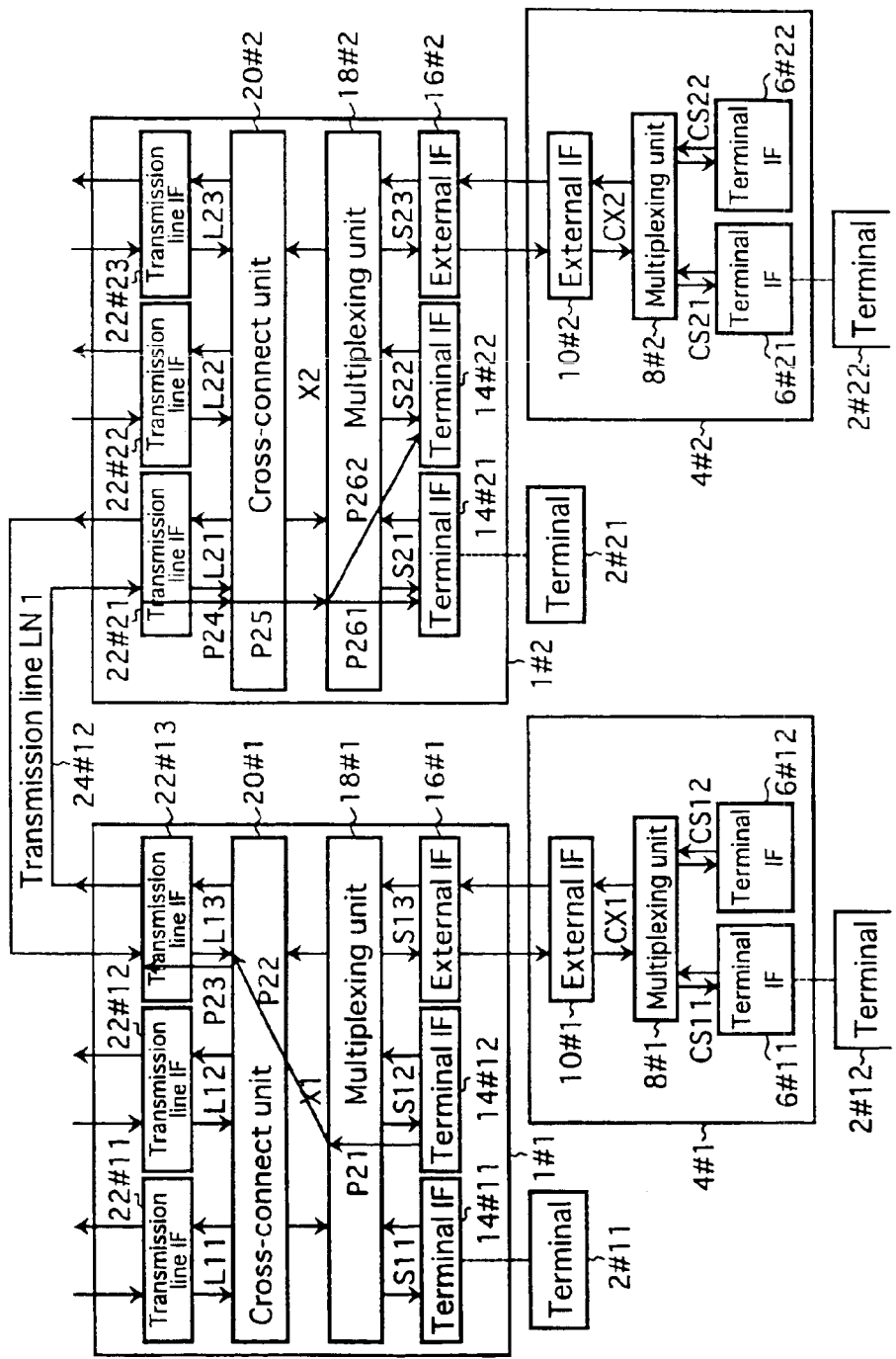
FIG. 13 is a diagram showing paths used in actual broadcasting.

FIG. 13 is a diagram showing paths used in actual broadcasting from the terminal 2#12 to the terminals 2#21 and 2#22 in the time-sharing multiplexing network shown in FIG. 2. As shown in FIG. 13, the paths used in the broadcasting from the terminal 2#12 to the terminals 2#21 and 2#22 are defined by path information P21 defining a path between connection points S11 and X1, path information P22 defining a path between connection points X1 and L13, path information P23 defining a path between connection points L13 and LN1, path information P24 defining a path between connection points LN1 and LN21, path information P25 defining a path between connection points L21 and X2, path information P261 defining a path between connection points X2 and S21 and path information P262 defining a path between connection points X2 and S22.

FIG. 14 is a diagram showing pieces of path information describing the paths shown in FIG. 13. As shown in FIG. 14, the pieces of path information P21 to P25 are the same as the pieces of path information P11 to P15 shown in FIG. 9 respectively except that the line-implementation identifiers are each changed from bi-directional to uni-directional and the group identifiers are each changed from G1 to G2. The path information P261 includes termination information 1 comprising a terminating connection point X2, an apparatus-internal-IF connection type and other data, termination information 2 comprising a terminating connection point S21, a terminal-IF connection type and other data, a line-implementation identifier indicating a uni-directional line. On the other hand, the path information P262 includes termination information 1 comprising a terminating connection point X2, an apparatus-internal-IF connection type and other data, termination information 2 comprising a terminating connection point S22, a terminal-IF connection type and other data, a line-implementation identifier indicating a uni-directional line.

FIG. 15 is a diagram showing information on allocation of time slots to the paths shown in FIG. 13. As shown in FIG. 15, the pieces of time-slot allocation information on the transmission side of the connection point X1, the transmission side of the connection point L13, the transmission side of the connection point LN1 and the reception side of the connection point L21 are the same as their counterparts shown in FIG. 11. A time-slot-allocation position TS#61 described in the information on allocation of time slots provided on the reception side of the connection point X2 is allocated to paths identified by the path management numbers P25, P261 and P262. A time-slot-allocation position TS#72 described in the information on allocation of time slots provided on the reception side of the connection point S21 is allocated to a path identified by the path management numbers P261. A time-slot-allocation position TS#81 described in the information on allocation of time slots provided on the reception side of the connection point S22 is allocated to a path identified by the path management numbers P262.

The path-information-creating unit 42 shown in FIG. 3 receives information on a path from the person in charge of network management. Information on a path like the one shown in FIG. 5 is stored the path-information file 50. The time-slot-allocation-information creating unit 44 inputs pieces of information on allocation of time slots provided for the transmission side and/or reception side of terminating connection points described in termination information 1 and termination information 2 of each information on a path, storing the pieces of information on allocation of time slots in the time-slot-allocation-information file 52. In addition, as many unused time slots as allocated time slots specified in each information on a path are set in each piece of information on allocation of time slots provided for the transmission and/or reception sides of each relaying connection point described in the route information of the information on a path. Moreover, data indicating the information on a path to which the unused time slots are allocated is described in the usage information of each information on allocation of time slots. The data indicating the information on a path described in the usage information is also stored in the time-slot-allocation-information file 52 as part of each piece of information on allocation of time slots. In the case of the path information P1 shown in FIG. 8, for example, data indicating the path information P1 is described in the usage information of the information on allocation of time slots at each of the connection points A12, . . . and A1N1-1. The connection points A12, . . . and A1N1-1 are determined from the number of allocated time slots, the line-implementation identifier and the information on a route of A11 ⇔ A12 . . . ⇔ A1N1-1 ⇔ A1N1, which are included in the path information P1.

By referring to the path-information file 50 and the time-slot-allocation-information file 52, the path-information-checking unit 46 detects each of the following cases as an error:

(1) A path-information group including path information with the number of allocated time slots different from the number of allocated time slots for other path information identified by a common group identifier assigned to the path-information group.

(2) A path-information group including path information describing a connection point with the positions of allocated time slots (that is, information on allocation of time slots) different from the positions of allocated time slots for the same connection point described in other path information identified by a common group identifier assigned to the path-information group.

(3) A smaller-than-two number of pieces of path information including a common group identifier assigned to a path-information group and describing a terminating connection point with the terminal-IF connection type.

(4) A path-information group including path information describing a terminating connection point with a terminal-I/F category different from the terminal-I/F category of the same connection point described in other path information identified by a common group identifier assigned to the path-information group.

(5) A path-information group including first path information describing a terminating connection point with a terminal-IF connection type on the transmission side and second path information describing a terminating connection point with a terminal-IF connection type on the reception side wherein the first path information is not correctly linked to the second path information.

(6) A path-information group including path information describing a connection point with the positions of allocated time slots (that is, information on allocation of time slots) shared by another connection point described in other path information identified by a different group identifier.

The result display unit 48 displays a path-information group detected as an error by the path-information-checking unit 46 as shown in none of the figures. The path-information file 50 is a file used for storing information on paths. On the other hand, the time-slot-allocation-information file 52 is a file used for storing information on allocation of time slots on the transmission and reception sides of connection points of each communication apparatus 12#i composing the time-sharing multiplexing network.

The operation of the intensive management apparatus 40 shown in FIG. 2 is explained as follows.

(1) Creation of Information on a Path

The path-information-creating unit 42 receives information on a path entered by the person in charge of network management via a terminal not shown in the figure and stores the information in the path-information file 50. The information on a path includes a path management number, a group identifier, the number of allocated time slots, termination information 1, termination information 2, a line-implementation identifier and information on a route.

(2) Creation of Information on Allocation of Time Slots

The time-slot-allocation-information creating unit 44 receives information on allocation of time slots on the transmission side and/or reception side of terminating connection points described in termination information 1 and termination information 2 of each information on a path from the person in charge of network management, and stores the information on allocation of time slots in the time-slot-allocation-information file 52. From a line-implementation identifier of each information on a path, the time-slot-allocation-information creating unit 44 further determines whether each relaying connection point described in the route information of the information on a path has information on allocation of time slots set on the transmission side and/or the reception side thereof. The time-slot-allocation-information creating unit 44 then sets as many available time slots as allocated time slots specified in information on a path in information on allocation of time slots on the transmission side and/or the reception side of each relaying connection point. Data indicating the information on a file to which the available time slots are allocated is then set in the usage information of the information on allocation of time slots. Then, the information on allocation of time slots with the data indicating the information on a file set in the usage information thereof is stored in the time-slot-allocation-information file 52.

Figure 16:
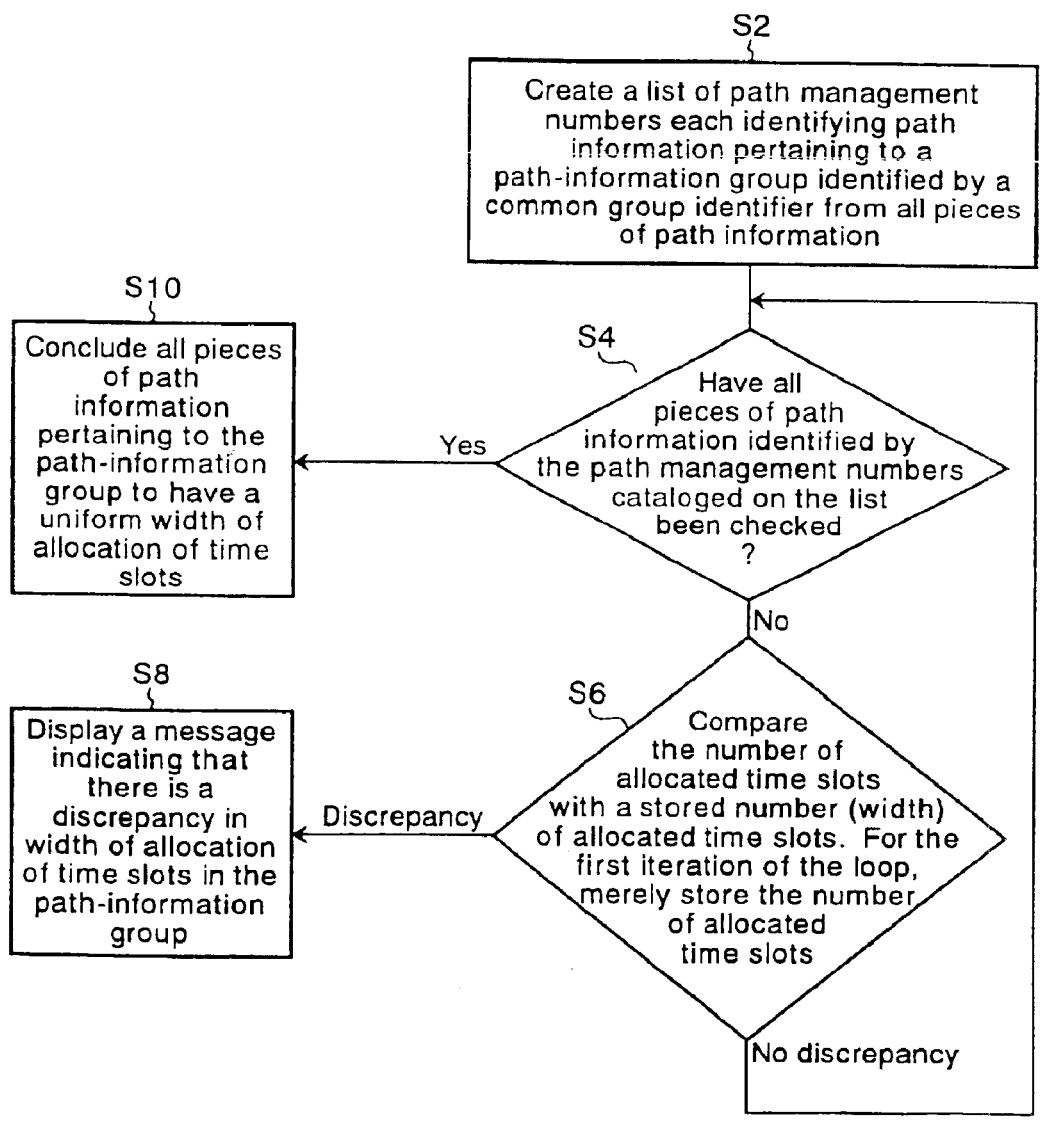
FIG. 16 shows a flowchart representing operations to check the width of allocation of time slots.

(3) Checking of Information on Paths 3-1: Check the Width of Allocation of Time Slots FIG. 16 shows a flowchart representing operations to check the width of allocation of time slots. Typically, the person in charge of network management specifies the group identifier assigned to a path-information group to be checked. As an alternative, the path-information-checking unit 46 selects the group identifier assigned to a path-information group to be checked. As shown in FIG. 16, the flowchart begins with a step S2 at which all pieces of path information are read out from the path-information file 50 and a list of path management numbers each identifying a piece of information on a path pertaining to a path-information group identified by a common group identifier is created. Assume that the group identifier is G1. In the case of information on paths shown in FIG. 9, the path management numbers P11 to P16 are cataloged on the list. The flow of the checking operation then goes on to a step S4 to form a judgment as to whether or not all pieces of information on a path identified by the path management numbers cataloged on the list have been checked. If the outcome of the judgment indicates that not all pieces of information on a path identified by the path management numbers cataloged on the list have been checked, the flow of the checking operation goes on to a step S6. If the outcome of the judgment indicates that all pieces of information on a path identified by the path management numbers cataloged on the list have been checked, on the other hand, the flow of the checking operation goes on to a step S10.

At the step S6, a next path management number is fetched from the list, and the number of time slots allocated at each connection point described in the information on a path identified by the fetched path management number is compared with a stored number of allocated time slots. It should be noted that, in the case of information on a path identified by the first path management number on the list, the number of allocated time slots described therein is merely saved as the stored number of allocated time slots to be compared in the next loop iteration. If the outcome of the judgment indicates that the number of allocated time slots described in the information on a path identified by the fetched path management number is equal to the stored number of allocated time slots, the flow of the checking operation goes back to the step S4. If the outcome of the judgment indicates that the number of allocated time slots described in the information on a path identified by the fetched path management number is not equal to the stored number of allocated time slots, on the other hand, the flow of the checking operation goes on to the step S8 at which the result display unit 48 displays a message indicating that there is a discrepancy in width of allocation of time slots in the path-information group. In the case of the information on paths shown in FIG. 9, for example, if there is a discrepancy in width of allocation of time slots among the pieces of path information P11 to P16 in the path-information group identified by a group identifier G1, a message is displayed to inform the person in charge of network management of such a discrepancy. Notified of a discrepancy in width of allocation of time slots, the person in charge of network management can then correct the pieces of path information P11 to P16 to eliminate the discrepancy. At the step S10, all pieces of information on a path pertaining to the path-information group are determined to have a uniform width of allocation of time slots.

Also in the case of the paths used in the broadcasting shown in FIG. 13, if there is a discrepancy in width of allocation of time slots among the pieces of path information P21 to P262 in the path-information group, a message is displayed to inform the person in charge of network management of such a discrepancy. The system is operated after verifying that no different widths of allocation of time slots are set in pieces of path information pertaining to a path-information group identified by a group identifier. As a result, it is possible to prevent a failure of transmitted data from occurring in transmission between terminals due to a discrepancy in width of allocation of time slots.

3-2: Check the Positions of Allocated Time Slots

Figure 17:
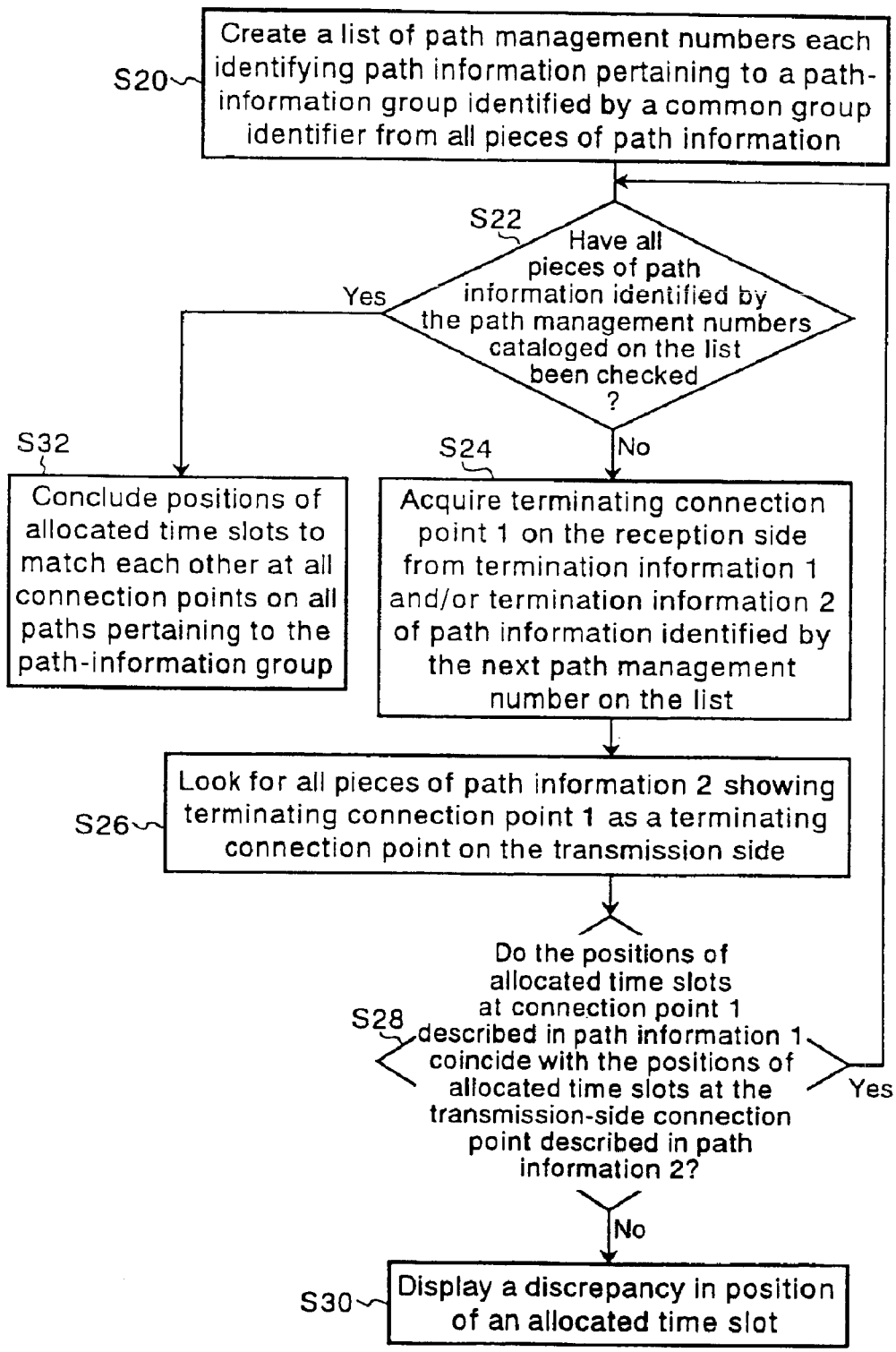
FIG. 17 shows a flowchart representing operations to check the positions of allocated time slots.

FIG. 17 shows a flowchart representing operations to check the positions of allocated time slots. As shown in FIG. 17, the flowchart begins with a step S20 at which all pieces of path information are read out from the path-information file 50 and a list of path management numbers each identifying a piece of information on a path pertaining to a path-information group identified by a common group identifier is created. Assume that the group identifier is G1. In the case of information on paths shown in FIG. 9, the path management numbers P11 to P16 are cataloged on the list. The flow of the checking operation then goes on to a step S22 to form a judgment as to whether or not all pieces of information on a path identified by the path management numbers cataloged on the list have been checked. If the outcome of the judgment indicates that not all pieces of information on a path identified by the path management numbers cataloged on the list have been checked, the flow of the checking operation goes on to a step S24. If the outcome of the judgment indicates that all pieces of information on a path identified by the path management numbers cataloged on the list have been checked, on the other hand, the flow of the checking operation goes on to a step S32. At the step S24, terminating connection point 1 on the reception side is acquired from termination information 1 and/or termination information 2 of information on a path identified by the next path management number on the list. The selection of termination information 1 and/or termination information 2 is based on the line-implementation identifier included in the information on a path. To be more specific, if the line-implementation identifier indicates that the transmission is in a direction from a terminating connection point A to a terminating connection point B where the terminating connection points A and B are described in termination information 1 and termination information 2 respectively, the terminating connection point B is regarded as a terminating connection point on the reception side. If the line-implementation identifier indicates that the transmission is in both the directions between the terminating connection point A and the terminating connection point B, on the other hand, the terminating connection points A and B are both considered to be a terminating connection point on the reception side. Only pieces of path information showing the terminating connection point on the reception side as a terminating connection point on the transmission side are subjected to comparison of positions of allocated time slots. In the case of information on paths shown in FIG. 9, assume for example that the path information P12 is currently subjected to the processing carried out at the step S24. Since the path information P12 indicates a bi-directional path, terminating connection points X1 and L13 are both taken as a terminating connection point on the reception side, that is, terminating connection point 1. At the next step S26, all pieces of path information showing terminating connection point 1 as a terminating connection point on the transmission side are looked for and each taken as path information 2. In the case of the paths shown in FIG. 4, for example, paths Pi and Pi+1 are adjacent to each other. A terminating connection point AiNi described in one of the pieces of termination information included in the information on the path Pi coincides with a terminating connection point Ai+1Ni described in the other piece of termination information included in the information on the path Pi+1. That is to say, the terminating connection point AiNi on the reception side of the path information Pi coincides with a terminating connection point Ai+1Ni on the transmission side of the path information Pi+1. If the terminating connection point AiNi is terminating connection point 1 acquired at the step S24, the information on the path Pi+1 is taken as path information 2 at the step S26.

In addition, in the case of the paths shown in FIG. 9, if the terminating connection point L13 is acquired as terminating connection point 1, the path information P13 is taken as path information 2. Furthermore, in the case of the broadcasting paths shown in FIG. 12, since the line-implementation identifier included in path information P1 defines a unidirectional line from a terminating connection point A11 described in termination information 1 to a terminating connection point A1N1 described in termination information 2, the terminating connection point A1N1 is acquired as terminating connection point 1. The terminating connection point A1N1 coincides with terminating connection points described in the pieces of path information P2 to Pn each as a terminating connection point on the transmission side in the transmissions in the directions from the terminal A to the terminals Bi. Thus, the pieces of path information P2 to Pn are each taken as path information 2. Information on allocation of time slots in the opposite directions, that is, directions from the terminals Bi to the terminal A, is not used so that it is not subjected to position comparison. Moreover, in the case of the broadcasting paths shown in FIG. 13, if the terminating connection point X2 is acquired as terminating connection point 1, the pieces of path information P261 and P262 are each taken as path information 2. As described above, also in the case of the broadcasting paths wherein paths branch at a terminating connection point, for pieces of information on all the paths branching at the terminating connection point, the positions of allocated time slots are subjected to comparison.

The flow of the checking operation then goes on to a step S28 to form a judgment as to whether or not the positions of allocated time slots at terminating connection point 1 described in path information 1 coincide with the positions of allocated time slots at a transmission-side terminating connection point described in path information 2 by referring to the time-slot-allocation-information file 52. In the case of the paths shown in FIG. 4, for example, the positions of allocated time slots at terminating connection point 1 described in path information Pi are compared with the positions of allocated time slots at a transmission-side terminating connection point described in path information Pi+1 to form a judgment as to whether or not the former coincides with the latter. The step S28 is in an iteration loop repeated for forming a judgment for each of terminating connection points AiNi where i=1 to n−1. In the case of the paths shown in FIG. 9, the positions of allocated time slots at a reception-side terminating connection point L13 described in path information P12 are compared with the positions of allocated time slots at a transmission-side terminating connection point L13 described in path information P13 to form a judgment as to whether or not the former coincides with the latter in accordance with the information on allocation of time slots at the terminating connection point L13. In the case of the broadcasting paths shown in FIG. 12, the positions of allocated time slots at a reception-side terminating connection point A1N1 described in the piece of path information P1 are compared with the positions of allocated time slots at transmission-side terminating connection points Ai1 described in the pieces of path information Pi where i=2 to n to form a judgment as to whether or not they coincide with each other in accordance with the information on allocation of time slots at those terminating connection points. In the case of the broadcasting paths shown in FIG. 13, the positions of allocated time slots at a reception-side terminating connection point X2 described in the piece of path information P25 are compared with the positions of allocated time slots at transmission-side terminating connection points described in the pieces of path information P261 and P262 to form a judgment as to whether or not they coincide with each other in accordance with the information on allocation of time slots at those terminating connection points X2. In either case, if the outcome of the judgment formed at the step S28 indicates that the positions of allocated time slots at reception-side terminating connection point 1 described in path information 1 do not coincide with the positions of allocated time slots at a transmission-side terminating connection point described in path information 2, the flow of the checking operation goes on to a step S30. If the outcome of the judgment formed at the step S28 indicates that the positions of allocated time slots at reception-side terminating connection point 1 described in path information 1 coincide with the positions of allocated time slots at a transmission-side terminating connection point described in path information 2, on the other hand, the flow of the checking operation goes back to the step S22. At the step S30 the result display unit 48 displays a discrepancy in position of an allocated time slot.

Figure 18:
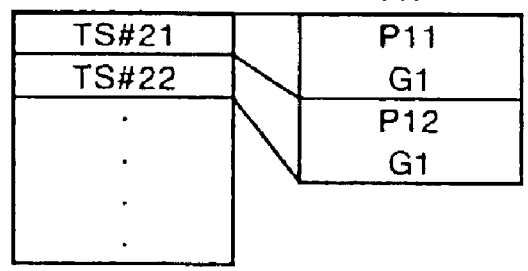
FIG. 18 is a diagram showing a discrepancy in positions of allocated time slots.

FIG. 18 is a diagram showing a discrepancy in positions of allocated time slots. As shown in FIG. 18, due to a setting mistake made by the person in charge of network management, a discrepancy in positions of allocated time slots between the path information P11 and the path information P12 is detected at the terminating connection point X1 of a path shown in FIG. 9. The result display unit 48 displays a message indicating such a discrepancy. The person in charge of network management can then correct information on allocation of time slots to eliminate the discrepancy. At the step S32, positions of allocated time slots are determined to match each other at all terminating connection points described in all pieces of path information pertaining to the path-information group. The system is operated after verifying that there is no discrepancy in positions of allocated time slots between pieces of information on adjacent paths pertaining to a path-information group identified by a group identifier. As a result, it is possible to prevent a failure of transmitted data from occurring in transmission between terminals due to a discrepancy in positions of allocated time slots.

3-3: Check the Number of Terminal IFs

Figure 19:
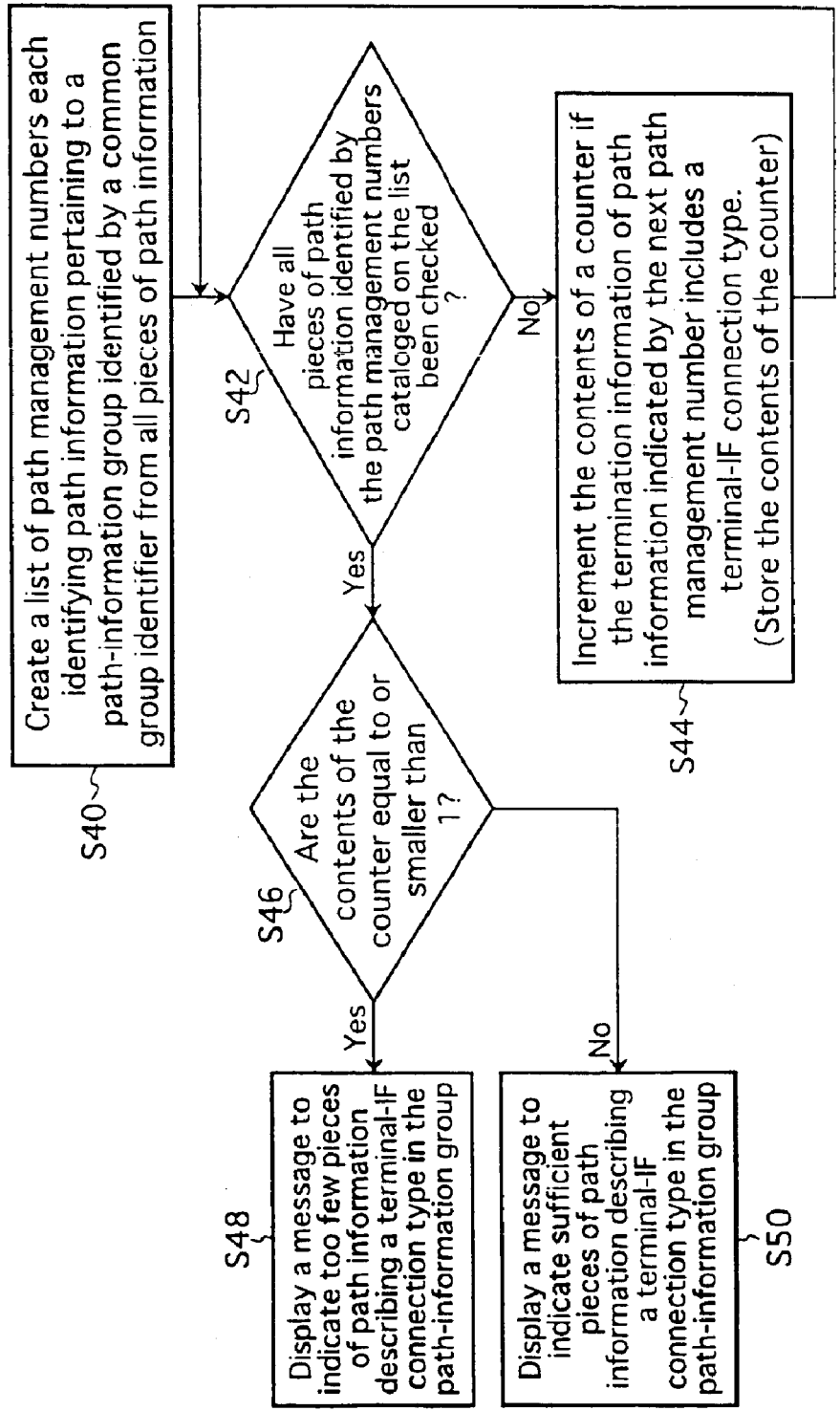
FIG. 19 shows a flowchart representing operations to check the number of terminal IFs.

FIG. 19 shows a flowchart representing operations to check the number of terminal IFs. As shown in the figure, the flowchart begins with a step S40 at which a list of path management numbers each identifying a piece of information on a path pertaining to a path-information group identified by a common group identifier is created from all pieces of information on paths. Assume that the group identifier is G1. In the case of information on paths shown in FIG. 9, the path management numbers P11 to P16 are cataloged on the list. With the group identifier G2 selected, on the other hand, a list of path management numbers P21 to P262 identifying pieces of path information shown in FIG. 14 is created. The flow of the checking operation then goes on to a step S42 to form a judgment as to whether or not all pieces of information on a path identified by the path management numbers cataloged on the list have been checked. If the outcome of the judgment indicates that not all pieces of information on a path identified by the path management numbers cataloged on the list have been checked, the flow of the checking operation goes on to a step S44. If the outcome of the judgment indicates that all pieces of information on a path identified by the path management numbers cataloged on the list have been checked, on the other hand, the flow of the checking operation goes on to a step S46.

At the step S44, if the termination information of information on a path indicated by the next path management number includes a terminal-IF connection type, the contents of a counter are incremented and the flow of the checking operation goes back to the step S42. If the termination information of information on a path indicated by the next path management number includes no terminal-IF connection type, on the other hand, the flow of the checking operation goes back to the step S42 without incrementing the contents of the counter. The processing of the steps S42 to S44 are carried out repeatedly for all pieces of path information identified by the path management numbers cataloged on the list to count the number of pieces of information including a terminal-IF connection type. At the step S46, the contents of the counter are examined. If the contents of the counter are equal to or smaller than 1, the flow of the checking operation goes on to a step S48. If the contents of the counter are equal to or greater than 2, on the other hand, the flow of the checking operation goes on to a step S50. At the step S48, a message is displayed to indicate too few pieces of path information describing a terminal-IF connection type in the path-information group. At the step S50, on the other hand, a message is displayed to indicate sufficient pieces of path information describing a terminal-IF connection type in the path-information group.

Figure 20:
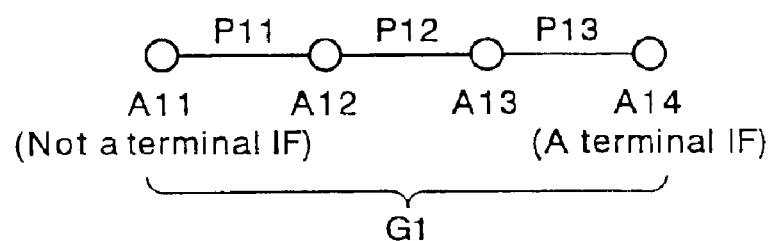
FIG. 20 is a diagram showing a lack of data indicating a terminal-IF connection type.

FIG. 20 is a diagram showing a lack of data indicating a terminal-IF connection type. Symbols P11, P12 and P13 shown in FIG. 20 each denote a path or information on the path pertaining to a path-information group. The path information P13 includes data indicating that a terminating connection point A14 has a terminal-IF connection type but the path information P11 includes data indicating that a terminating connection point A11 has a connection type other than the terminal-IF connection type. Thus, the number of terminal IFs is only 1, indicating that the path-information group has a lack of data showing a terminal-IF connection type. In this case, a message is displayed to indicate that the pieces of path information pertaining to the path-information group has a lack of data representing a terminal-IF connection type as line-defining information. Thus, by formation of a judgment as to whether or not a complete path defined by a path-information group identified by a group identifier is terminated by at least 2 terminating connection points each capable of serving as an interface with a terminal, it is possible to prevent information on paths disabling a system operation to be reflected in the system as line-defining information due to an incorrect procedure of creating information on a path. It is thus possible to prevent the system operation based on the line-defining information from being affected by reflection of incorrect information on a path in the system.

3-4: Check the Terminal-I/F Category

Figure 21:
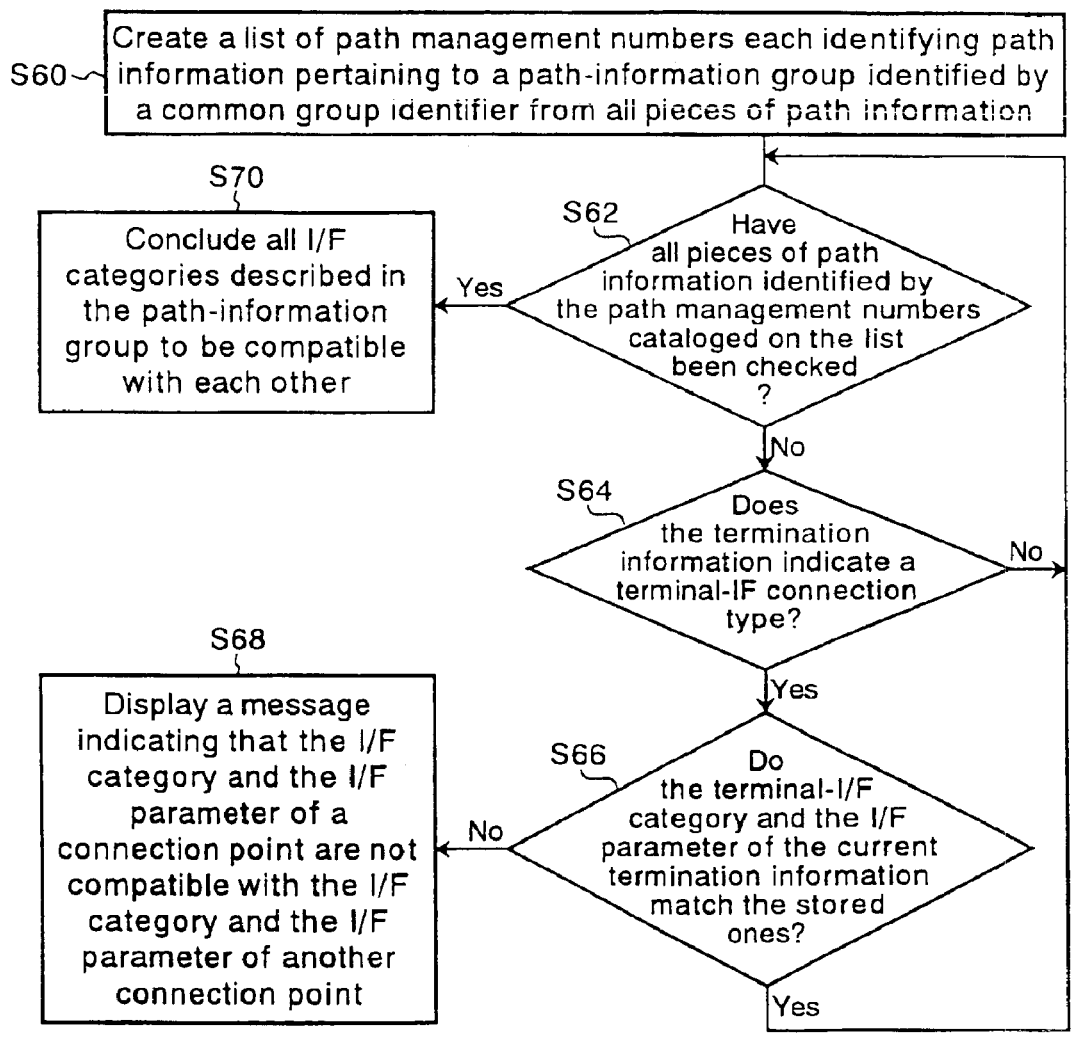
FIG. 21 shows a flowchart representing operations to check the terminal-I/F category of each terminal-IF connection type.

FIG. 21 shows a flowchart representing operations to check the terminal-I/F category and the I/F parameter of each terminal-IF connection type. As shown in the figure, the flowchart begins with a step S60 at which a list of path management numbers each identifying a piece of information on a path pertaining to a path-information group identified by a common group identifier is created from all pieces of information on paths. Assume that the group identifier is G1. In the case of information on paths shown in FIG. 9, the path management numbers P11 to P16 are cataloged on the list. With the group identifier G2 selected, on the other hand, a list of path management numbers P21 to P262 identifying pieces of path information shown in FIG. 14 is created. The flow of the checking operation then goes on to a step S62 to form a judgment as to whether or not all pieces of information on a path identified by the path management numbers cataloged on the list have been checked. If the outcome of the judgment indicates that not all pieces of information on a path identified by the path management numbers cataloged on the list have been checked, the flow of the checking operation goes on to a step S64. If the outcome of the judgment indicates that all pieces of information on a path identified by the path management numbers cataloged on the list have been checked, on the other hand, the flow of the checking operation goes on to a step S70.

At the step S64, the termination information included in the current information on a path is examined to form a judgment as to whether or not the termination information indicates a terminal-IF connection type. If the outcome of the judgment indicates that the termination information included in the current information on a path indicates a terminal-IF connection type, the flow of the checking operation goes on to a step S66. If the outcome of the judgment indicates that the termination information included in the current information on a path does not indicate a terminal-IF connection type, on the other hand, the flow of the checking operation goes back to the step S62. In the case of the paths shown in FIG. 9, for example, the termination information included in the path information P11 and the termination information included in the path information P16 each indicate a terminal-IF connection type. In the case of the paths shown in FIG. 14, on the other hand, the termination information included in the path information P21, the termination information included in the path information P261 and the termination information included in the path information P262 each indicate a terminal-IF connection type. At the step S66, the terminal-I/F category and the I/F parameter of termination information stored by the processing carried out so far as part of termination information indicating a terminal-IF connection type are compared with the terminal-I/F category and the I/F parameter of the termination information obtained in the current loop iteration to form a judgment as to whether or not the I/F categories and the I/F parameters are compatible with each other. In the case of the paths shown in FIG. 4, for example, the terminal-I/F category and the I/F parameter of the terminating connection point A11 are compared with the terminal-I/F category and the I/F parameter of the terminating connection point AnNn. In the case of the paths shown in FIG. 9, the terminal-I/F category and the I/F parameter of the terminating connection point S11 are compared with the terminal-I/F category and the I/F parameter of the terminating connection point S21. In the case of the paths shown in FIG. 12, the I/F category and the I/F parameter of the terminating connection point A11 are compared with the I/F categories and the I/F parameters of the terminating connection points A2N2, ... and AnNn. In the case of the paths shown in FIG. 14, the I/F category and the I/F parameter of the terminating connection point S12 are compared with the I/F categories and the I/F parameters of the terminating connection points S21 and S22. If the outcome of the judgment indicates that the I/F categories and the I/F parameters are compatible with each other, the flow of the checking operation goes back to the step S62. If the outcome of the judgment indicates that the I/F categories and the I/F parameters are not compatible with each other, on the other hand, the flow of the checking operation goes on to a step S68 at which the result display unit 48 displays a message indicating that the I/F category and the I/F parameter of a terminating connection point of the terminal-IF connection type are not compatible with the I/F category and the I/F parameter of another terminating connection point of the terminal-IF connection type. At the step S70, all I/F categories and all I/F parameters described in the path-information group are determined to be compatible with each other. By comparing I/F categories and I/F parameters of different pieces of path information each having termination information indicating a terminal-IF connection type in a path-information group identified by a common group identifier as described above, it is possible to prevent information on a path disabling a system operation from being reflected in the system as information for defining lines.

3-5: Check Connection Routes Between Terminals

Figure 22:
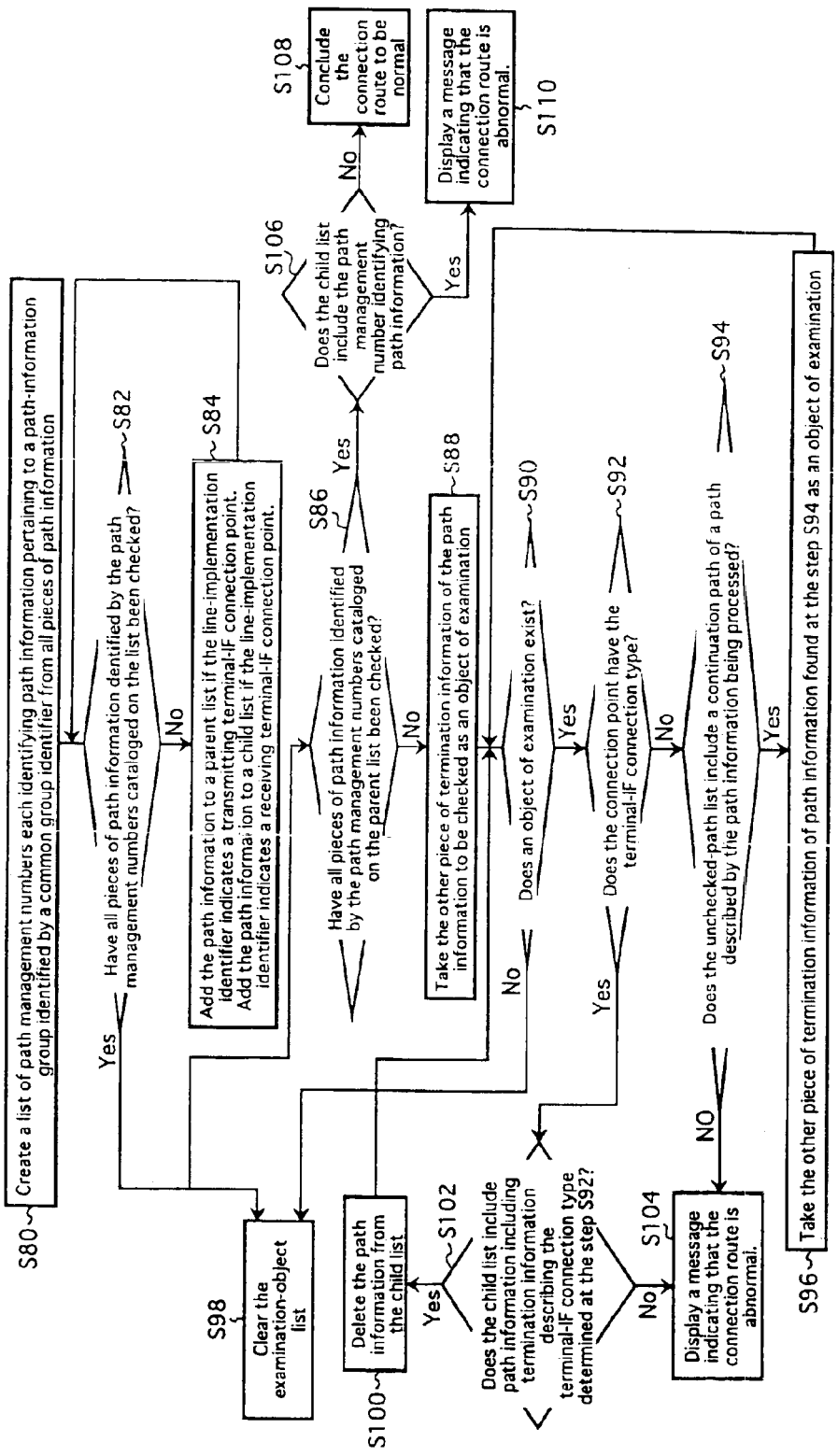
FIG. 22 shows a flowchart representing operations to check a connection route between terminals.

FIG. 22 shows a flowchart representing operations to check a connection route between terminals. As shown in the figure, the flowchart begins with a step S80 at which a list of path management numbers each identifying a piece of information on a path pertaining to a path-information group identified by a common group identifier is created from all pieces of information on paths. Assume that the group identifier is G1. In the case of information on paths shown in FIG. 9, the path management numbers P11 to P16 are cataloged on the list. With the group identifier G2 selected, on the other hand, a list of path management numbers P21 to P262 identifying pieces of path information shown in FIG. 14 is created. The flow of the checking operation then goes on to a step S82 to form a judgment as to whether or not all pieces of information on a path identified by the path management numbers cataloged on the list have been checked. If the outcome of the judgment indicates that not all pieces of information on a path identified by the path management numbers cataloged on the list have been checked, the flow of the checking operation goes on to a step S84. If the outcome of the judgment indicates that all pieces of information on a path identified by the path management numbers cataloged on the list have been checked, on the other hand, the flow of the checking operation goes on to a step S86.

Processing at the step S84 is carried out if termination information 1 and/or termination information 2 included in the information on a path indicates a terminal-IF connection type. At this step, if the line-implementation identifier indicates that a terminating connection point having the terminal-IF connection type is a terminating connection point on the transmission side, the information on a path is added to a parent list. If the line-implementation identifier indicates that a terminating connection point having the terminal-IF connection type is a terminating connection point on the reception side, the information on a path is added to a child list. If the line-implementation identifier indicates a bi-directional line from and to a terminating connection point having the terminal-IF connection type, the information on a path is added to both the parent and child lists. The flow of the checking operation then goes back to the step S82. A plurality of pieces of path information are cataloged on a parent list for example when communications are carried out in both the directions between terminals A and B. In the same way, a plurality of pieces of path information are cataloged on a child list for example when communications are carried out in both the directions between terminals A and B or when broadcasting is performed. In the case of information on paths shown in FIG. 4, for example, the path management numbers P1 and Pn are cataloged on a parent list and a child list. In the case of information on paths shown in FIG. 9, the path management numbers P11 and P16 are cataloged on the parent list and the child list. In the case of information on paths shown in FIG. 12, the path management number P1 is cataloged on the parent list and the path management numbers P2 to Pn are cataloged on the child list. In the case of information on paths shown in FIG. 13, the path management number P21 is cataloged on the parent list whereas the path management numbers P261 and P262 are cataloged on the child list.

At the step S86, the parent list is examined to form a judgment as to whether or not all pieces of information on a path identified by the path management numbers cataloged on the parent list have been checked. If the outcome of the judgment indicates that all pieces of information on a path identified by the path management numbers cataloged on the parent list have been checked, the flow of the checking operation goes on to a step S106. If the outcome of the judgment indicates that not all pieces of information on a path identified by the path management numbers cataloged on the parent list have been checked, on the other hand, a next path management number identifying a piece of information on a path to be checked is fetched from the parent list. The flow of the checking operation then goes on to a step S88 at which the other piece of termination information of the information on a path to be checked is taken as an object of examination. The other piece of termination information is termination information other than the aforementioned piece of termination information that indicates the terminal-IF connection type. In the case of information on paths shown in FIG. 4, for example, the other piece of termination information describing the terminating connection point A1N1 in the path information P1 is taken as an object of examination. In the case of information on paths shown in FIG. 9, the other piece of termination information describing the terminating connection point X1 in the path information P1 for or the other piece of termination information describing the terminating connection point X2 in the path information P16 is taken as an object of examination. In the case of information on paths shown in FIG. 12, the other piece of termination information describing the terminating connection point A1N1 included in the path information P1 is taken as an object of examination. In the case of information on paths shown in FIG. 13, the other piece of termination information describing the terminating connection point X1 included in the path information P21 is taken as an object of examination.

The flow of the checking operation then goes on to a step S90 to form a judgment as to whether or not an object of examination exists. If the outcome of the judgment indicates that an object of examination does not exist, the flow of the checking operation goes on to a step S98. If the outcome of the judgment indicates that an object of examination exists, on the other hand, the flow of the checking operation goes on to a step S92 to form a judgment as to whether or not termination information of information on a path describes a terminating connection point of the object of examination as a terminating connection point of the terminal-IF connection type. If the outcome of the judgment indicates that the termination information of information on a path describes a terminating connection point of the object of examination as a terminating connection point of the terminal-IF connection type, the flow of the checking operation goes on to a step S102. If the outcome of the judgment indicates that the termination information of information on a path describes a terminating connection point of the object of examination as a terminating connection point of a connection type other than the terminal-IF connection type, on the other hand, the flow of the checking operation goes on to a step S94 to form a judgment as to whether or not a list of unchecked paths includes a path management number identifying particular path information satisfying the 3 following conditions. In the first place, the particular path information pertains to the same path-information group as the path information being processed. In the second place, the particular path information includes termination information describing a terminating connection point coinciding with the terminating connection point being processed. In the third place, at the terminating connection point described in the particular path information, positions of allocated time slots match positions of allocated time slots of the same direction at the terminating connection point being processed. The list of unchecked paths is a list of path management numbers each identifying path information cataloged on the list of path management numbers. The list of unchecked paths is the list created at the step S80. A list of examination objects created at a step S96 is a list of pieces of other termination information each included in path information satisfying the conditions as determined at the step S94. Termination information included in path information not satisfying the conditions as determined at the step S94 is not cataloged on the list of examination objects. The list of examination objects is provided separately from the list of unchecked paths in order to avoid double checking. If the outcome of the judgment formed at the step S94 indicates that the list of unchecked paths includes a path management number identifying particular path information satisfying the 3 conditions, the flow of the checking operation goes on to the step S96. If the outcome of the judgment indicates formed at the step S94 indicates that the list of unchecked paths does not include a path management number identifying particular path information satisfying the 3 conditions, on the other hand, the flow of the checking operation goes on to a step S104. In the case of the paths shown in FIG. 4, for example, assume that the termination information for the terminating connection point A1N1 has been taken as an object of examination. In this case, the path management number identifying the path information P2 is found from the list of unchecked paths. In the case of the paths shown in FIG. 9, assume that the termination information for the terminating connection point X1 has been taken as an object of examination. In this case, the path management number identifying the path information P12 is found from the list of unchecked paths. In the case of the paths shown in FIG. 12, assume that the termination information for the terminating connection point A1N1 has been taken as an object of examination. In this case, the path management numbers identifying the pieces of path information P2 to Pn are found from the list of unchecked paths. In the case of the paths shown in FIG. 13, assume that the termination information for the terminating connection point X1 has been taken as an object of examination. In this case, the path management number identifying the path information P22 is found from the list of unchecked paths.

At the step S96, the termination information other than the termination information describing the terminating connection point coinciding the terminating connection point being processed, that is, the termination information other than the termination information included in the path information satisfying the conditions of the step S94, is treated as a next object of examination. In the case of the paths shown in FIG. 4, for example, assume that the termination information for the terminating connection point A1N1 has been taken as an object of examination. In this case, the other termination information included in the path information P2 satisfying the conditions of the step S94 is treated as a next object of examination. In the case of the paths shown in FIG. 9, assume that the termination information for the terminating connection point X1 has been taken as an object of examination. In this case, the other termination information included in the path information P12 satisfying the conditions of the step S94 is treated as a next object of examination. In the case of the paths shown in FIG. 12, assume that the termination information for the terminating connection point A1N1 has been taken as an object of examination. In this case, the other termination information included in each of the pieces of path information P2 to Pn satisfying the conditions of the step S94 is treated as a next object of examination. In the case of the paths shown in FIG. 13, assume that the termination information for the terminating connection point X1 has been taken as an object of examination. In this case, the other termination information included in the path information P22 satisfying the conditions of the step S94 is treated as a next object of examination. Then, the flow of the checking operation goes back to the step S90.

By going through the steps S90 to S96 repeatedly, processing is carried out to search a route for pieces of other termination information to serve as objects of examination. The route comprises paths described by pieces of path information starting with path information including a terminating connection point of a terminal-IF connection type on the transmission side of the route and ending with path information including a terminating connection point of a terminal-IF connection type on the reception side of the route. In the case of the paths shown in FIG. 4, for example, the searched route comprises paths between the following terminating connection points: A11→A1N1→A2N2→ . . . →AnNn. In the case of the paths shown in FIG. 9, the searched route comprises paths between the following terminating connection points: S11→X1→L13→L21→X2→S21. In the case of the paths shown in FIG. 12, the searched route comprises paths between the following terminating connection points: A11→A1N1→AiNi where i=2 to n. In the case of the paths shown in FIG. 13, the searched route comprises paths between the following terminating connection points: S11→X1→L13→L21→X2→S21 (and S22).

If the termination information examined at the step S92 indicates that each of the terminating connection point AnNn shown in FIG. 4, the terminating connection point S21 shown in FIG. 9, the terminating connection points A2N2, A3N3, . . . and AnNn shown in FIG. 12 and the terminating connection point S21 shown in FIG. 13 is a terminating connection point of the terminal-IF connection type, the flow of the checking operation goes on to a step S102.

At the step S102, the child list is examined to form a judgment as to whether or not the list includes path information including the termination information determined at the step S92 to describe the terminal-IF connection type. If the outcome of the judgment indicates that the child list does not include such path information, the flow of the checking operation goes on to a step S104. If the outcome of the judgment indicates that the child list includes such path information on the other hand, the flow of the checking operation goes on to a step S100. In the case of each of the terminating connection point AnNn shown in FIG. 4, the terminating connection point S21 shown in FIG. 9, the terminating connection point A2N2 shown in FIG. 12 and the terminating connection point S21 shown in FIG. 13, the child list includes path information including termination information describing the terminating connection point as a terminating connection point of the terminal-IF connection type. Thus, the flow of the checking operation goes on to the step S100 at which the path information is deleted from the child list. Then, the flow of the checking operation goes back to the step S90. For example, the path information Pn shown in FIG. 4, the path information P16 shown in FIG. 9, the path information P2 shown in FIG. 12 and the path information P261 shown in FIG. 13 are deleted from the child list. As described above, at the step S90, a judgment as to whether or not an object of examination exists is formed. If the outcome of the judgment indicates that an object of examination does not exist, the flow of the checking operation goes on to the step S98. If the outcome of the judgment indicates that an object of examination exists, on the other hand, the flow of the checking operation goes on to the step S92.

In the case of the path information P1 shown in FIG. 4 and the path information P11 shown in FIG. 9, for example, only one object of examination is created at the step S96. Thus, after the iteration of the loop comprising the steps S90 to S96 is completed to examine the object of examination, the outcome of the judgment formed at the step S90 indicates that an object of examination does not exist anymore. As a result, the flow of the checking operation goes on to the step S98. In the case of paths shown in FIG. 12, however, for each of the pieces of path information Pi where i=2 to n, an object of examination is created at the step S96. The created objects of examination are cataloged on the list of examination objects. Thus, after an iteration of the loop comprising the steps S90 to S96 is completed to examine an object of examination, the outcome of the judgment formed at the step S90 still indicates that an object of examination remains on the list of examination objects to be processed. Thus, the flow of the checking operation goes on to the step S92 to repeat the processing carried out at the steps S90 to S96 till all the objects of examinations on the list of examination objects are processed. The paths shown in FIG. 13 are processed in the same way as the paths shown in FIG. 12.

At the step S98, the list of examination objects is cleared. The flow of the checking operation then goes on to the step S86. As described above, if the outcome of the judgment formed at the step S86 indicates that all pieces of information on a path identified by the path management numbers cataloged on the parent list have been checked, the flow of the checking operation goes on to the step S106 to form a judgment as to whether or not a connection route for the group's paths described by path information Pi is normal. If the outcome of the judgment formed at the step S86 indicates that not all pieces of information on a path identified by the path management numbers cataloged on the parent list have been checked, on the other hand, the flow of the checking operation goes on to the step S88 to repeat the processing carried out at the steps S86 to S104. In the case of the paths shown in FIG. 4, for example, communications between the terminals A and B are carried out in both the directions. Thus, in this case, with respect to the path information Pn already cataloged on the parent list, the processing carried out at the steps S86 to S104 is repeated for the direction from the terminal B to the terminal A. In this way, it is possible to form a judgment as to whether or not a connection route from a path described by the path information Pn to a path described by the path information P1 already cataloged on the child list is normal. It is also possible to form a judgment on as to whether or not a connection route comprising the paths shown in FIG. 9 is normal in the same way as the paths shown in FIG. 4. In addition, it is also possible to form a judgment as to whether or not a connection route of the broadcasting from the path described by the path information P1 to the paths described by the pieces of path information Pi where i=2 to n is normal. Moreover, it is also possible to form a judgment on as to whether or not a connection route comprising the paths shown in FIG. 13 is normal in the same way as the paths shown in FIG. 12.

Figure 23:
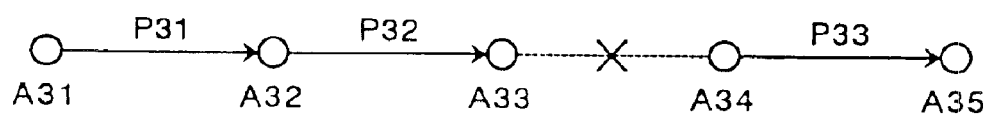
FIG. 23 shows a flowchart representing operations to check an abnormality occurring in a connection route between terminals.

FIG. 23 shows a flowchart representing operations to check an abnormality occurring in a connection route between the terminals A and B as detected by the checking operations represented by the flowchart shown in FIG. 22. The terminating connection points A31 and A35 shown in FIG. 23 are each a terminating connection point of the terminal-IF connection type. As shown in FIG. 23, no information on a path between the terminating connection points A33 and A34. First of all, the iteration of the loop comprising the steps S90 to S96 is repeated to examine pieces of termination information included in pieces of path information describing the (A31→A32→A33) paths composing the connection route of interest. One of the pieces of path information includes termination information specifying the terminating connection point A33, which is not a terminating connection point of the terminal-IF connection type. Thus, the flow of the checking operation goes on from the step S92 to the S94. However, the judgment formed at the step S94 indicates that path information satisfying the conditions does not exist due to the fact that no path information is provided for the path between terminating communication points A33 and A34. In this case, the flow of the checking operation goes on to the step S104 at which the result display unit 48 displays a message indicating that the connection route is abnormal.

At the step S106, the child list is searched for information on a path. If the path management number identifying a piece of information on a path is not found on the child list, the flow of the checking operation goes on to a step S108 at which the connection route in the path-information group is determined to be normal. If information on a path is found on the child list, on the other hand, the flow of the checking operation goes on to a step S110. As an example, assume a case in which path information is cut in the middle between terminals A and B as shown in FIG. 23. In this case, since path information remains on the child list, the flow of the checking operation goes on to the step S110 at which the result display unit 48 displays a message indicating that the connection route is abnormal.

Seeing a message indicating that a connection route is abnormal, the person in charge of network management corrects information on allocation of time slots and information on a path that are related to the abnormality. By verifying that inter-terminal transmission lines implementing paths described by pieces of path information pertaining to a path-information group identified by a common group identifier form at least a route between the terminals as described above, it is possible to prevent transmitted data from being lost in the system due to a link missing from the route between the terminals.

3-6: Check a Contention for Positions of Allocated Time Slots

Figure 24:
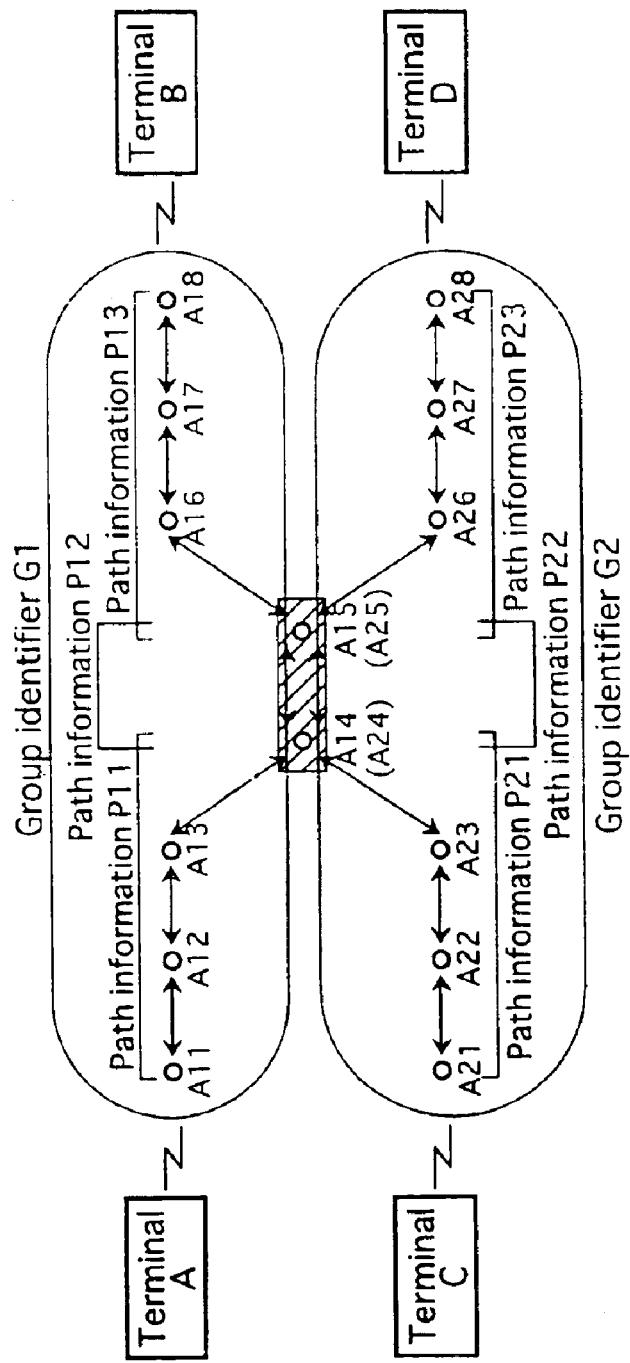
FIG. 24 is a diagram showing a contention between groups.

FIG. 24 is a diagram showing a contention for positions of allocated time slots between groups. As shown in FIG. 24, paths passing through terminating connection points A11 to A18 between terminals A and B are described by pieces of path information P11 ⇔ P12 ⇔ P13 where the symbol P11 denotes path information describing the A11 ⇔ A12 ⇔ A13 ⇔ A14 paths, the symbol P12 denotes path information describing the A14 ⇔ A15 path and the symbol P13 is path information describing the A15 ⇔ A16 ⇔ A17 ⇔ A18 paths. By the same token, paths passing through terminating connection points A21 to A28 between terminals A and B are described by pieces of path information P21 ⇔ P22 ⇔ P23 where the symbol P21 denotes path information describing the A21 ⇔ A22 ⇔ A23 ⇔ A24 (=A14) paths, the symbol P22 denotes path information describing the A24 ⇔ A25 (=A15) path and the symbol P23 is path information describing the A25 ⇔ A26 ⇔ A27 ⇔ A28 paths.

Figure 25:
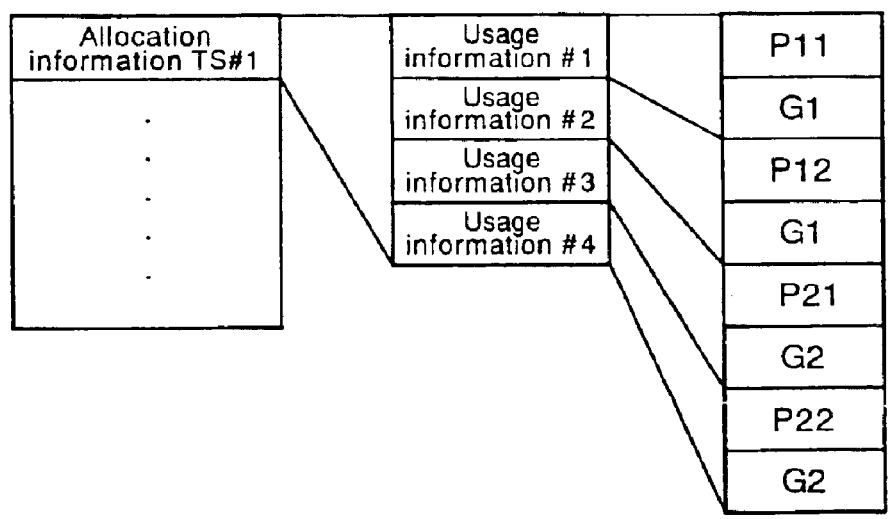
FIG. 25 is a diagram showing a contention for the position of an allocated time slot.

The terminating connection points A14 and A15 described in the path information P12 coincide with respectively the terminating connection points A24 and A25 described in the path information P22 due to a setting mistake made by the person in charge of network management so that it is quite within the bounds of possibility that there is a contention for positions of allocated time slots at the common terminating connection point A14 (=A24) or A15 (=A25) between a path defined by a path-information group identified by a group identifier G1 comprising the pieces of path information P11, P12 and P13 and a path defined by a path-information group identified by a group identifier G2 comprising the pieces of path information P21, P22 and P23. Such a contention is exemplified by the input port of one of 2 paths of the cross-connect unit 20#i shown in FIG. 27 coinciding with the output port of the other path of the cross-connect unit 20#i. Such a contention is caused by coincidence of a position of an allocated time slot at a connection point described in the path information P12 with a position of an allocated time slot at the same connection point described in the path information P22. In the example shown in FIG. 24, the contention is caused by coincidence in information on allocation of time slots at the terminating connection point A14 (=A24) or A15 (=A25). If a contention for the position of an allocated time slot exists, pieces of transmitted data will collide at the time slot, causing an abnormality. FIG. 25 is a diagram showing a contention for the position of an allocated time slot. The figure shows information on allocation of a time slot at a terminating connection point A14. As shown in FIG. 25, for example, there is a contention for an allocated-time-slot position TS#1 between a path described by path information P11 pertaining to a path-information group identified by a group identifier G1 as indicated by usage information #1 and a path described in path information P21 pertaining to a path-information group identified by a group identifier G2 as indicated by usage information #3. It is possible to form a judgment as to whether or not there is a contention for an allocated-time-slot position between a path described by path information pertaining to a path-information group identified by a group identifier G1 and a path described by path information pertaining to a path-information group identified by a group identifier G2 by checking pieces of usage information included in information on allocation of the time slot at the position of contention at each terminating connection point.

Figure 26:
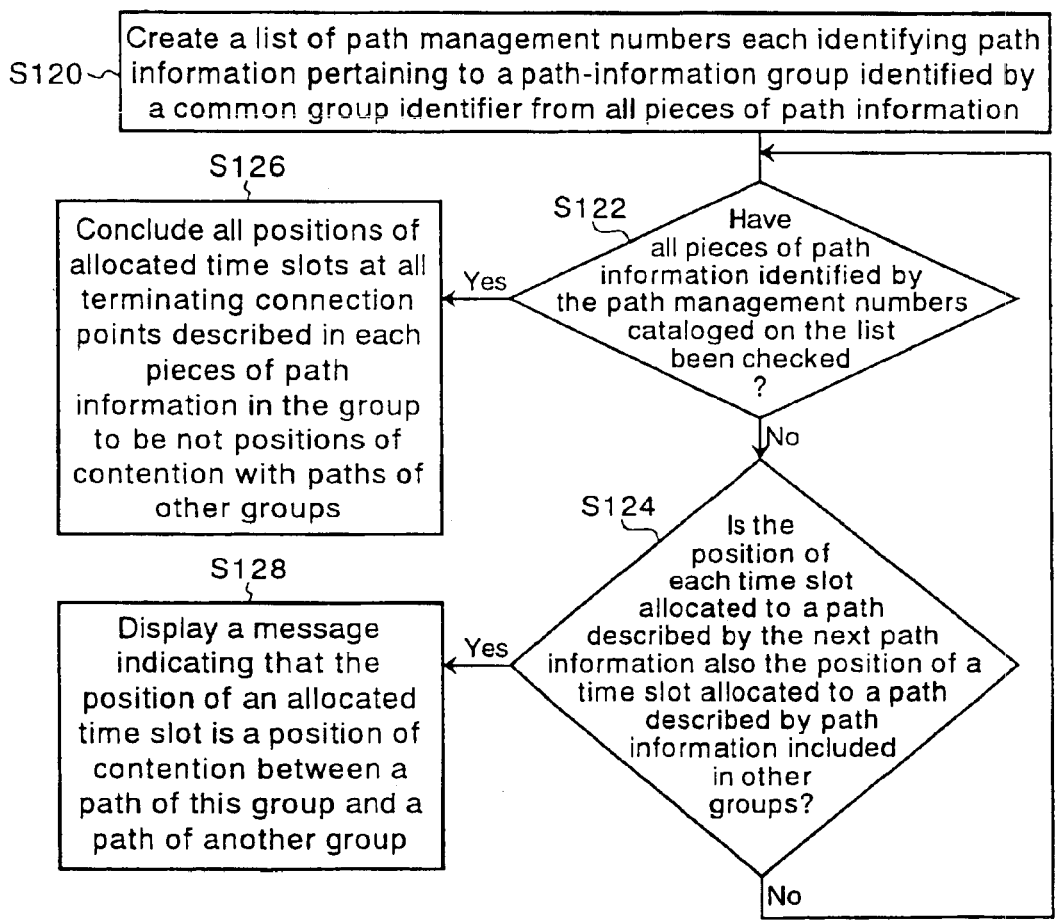
FIG. 26 shows a flowchart representing operations to check a contention for the position of an allocated time slot between groups.

FIG. 26 shows a flowchart representing operations to check a contention for the position of an allocated time slot between paths pertaining to different groups. As shown in the figure, the flowchart begins with a step S120 at which a list of path-management numbers each identifying path information pertaining to a path-information group identified by a group identifier is created from all pieces of path information pertaining to the path-information group. In the case of the path-information group identified by the group identifier G1 shown in FIG. 24, for example, the path-management numbers P11, P12 and P13 of the pieces of path information pertaining to the path-information group G1 are cataloged on the path-management-number list. The flow of the checking operation then goes on to a step S122 to form a judgment as to whether or not all path-management numbers on the path-management-number list have been processed. If the outcome of the judgment indicates that all path-management numbers on the path-management-number list have been processed, the flow of the processing goes on to a step S126 at which all positions of allocated time slots at all terminating connection points described in each pieces of path information in the group are determined to be not a position of contention with other groups. If the outcome of the judgment indicates that not all path-management numbers on the path-management-number list have been processed, on the other hand, a next path-management number is fetched from the path-management-number list, and the flow of the processing goes on to a step S124 to form a judgment as to whether or not the position of each time slot allocated to a path described by path information indicated by the fetched path-management number at terminating connection points described by termination information 1 and termination information 2, which are included in the path information, is also the position of a time slot allocated to a path described by path information pertaining to another path-information group. The judgment is formed by referring to usage information for the position of the allocated time slot. If the outcome of the judgment indicates that the positions of all allocated time slots are not positions of contention between a path pertaining to the specified path-information group and a path pertaining to the other path-information group, the flow of the checking operation goes back to the step S122 to form a judgment as to whether or not all path-management numbers on the path-management-number list have been processed as described above.

In the case of the paths shown in FIG. 24, the processing of the steps S122 and S124 is carried out repeatedly to form a judgment as to whether or not the position of each time slot allocated to a path described by path information indicated by the fetched path-management number at terminating connection points described by termination information 1 and termination information 2, which are included in the path information, is also allocated to a path described by path information pertaining to another path-information group by referring to usage information for the position of the allocated time slot for the pieces of path information P11, P12 and P13. If the outcome of the judgment formed at the step S124 indicates that the position of an allocated time slot is a position of contention between a path pertaining to the specified path-information group and a path pertaining to the other path-information group, the flow of the checking operation goes on to a step S128. At the step S128, the result display unit 48 displays a message indicating that the position of an allocated time slot is a position of contention between a path pertaining to the specified path-information group and a path pertaining to the other path-information group. By forming a judgment as to whether or not the position of each time slot allocated to a path described by path information indicated by a path-management number at terminating connection points described by termination information 1 and termination information 2, which are included in the path information, is also allocated to a path described by path information pertaining to another path-information group by reference to usage information for the position of the allocated time slot for all pieces of path information pertaining to a path-information group identified by a common group identifier, it is possible to prevent data transmitted through a line and data transmitted through another line from colliding.

As described above, in accordance with the present invention, the validity of paths described by pieces of path information pertaining to a path-information group identified by a common group identifier are checked. As a result, it is possible to prevent a failure from occurring in transmitted data.

It should be noted that the present invention is not limited to the details of the preferred embodiments described above. Instead, the scope of the present invention is defined by the appended claims, and all changes and modifications falling within the scope of the claims are therefore to be embraced by the invention.

What is claimed is:

1. An intensive management apparatus for managing a time-sharing multiplexing network including:
    a plurality of terminals;
    a plurality of communication apparatuses each for communicating transmitted data accommodated in each of time slots by mapping said transmitted data onto said time slots allocated to a transmission line and allocated in said communication apparatus for transmitting said transmitted data on the basis of line-setting information; and
    a plurality of transmission lines connecting said communication apparatuses to each other,
    said intensive management apparatus comprising:
    a path-information-creating unit for creating path information including a group identifier, termination information of terminating connection points, a path management number assigned to a path connecting said terminating connection points at which said time slots in said communication apparatus are allocated and an allocated-time-slot number;
    a time-slot allocating unit for creating time-slot-allocation information describing allocation of said time slots to a path identified by said path management number included in said time-slot-allocation information at each of said terminating connection points:
    a path-information-checking unit for forming a judgment as to whether or not a plurality of paths identified by the same value of said group identifier assigned to a path-information group comprising pieces of path information group describing said paths on the basis of said path information and said time-slot-allocation, are defined correctly between said plurality of terminals,
    wherein said path information and time-slot-allocation information are defined separately, and
    a result display unit for displaying results of said judgment.

2. An intensive management apparatus according to claim 1 wherein said path-information-checking unit forms a judgment as to whether or not a time slot is shared by another path pertaining to said path-information group at each of said terminating connection points described in said pieces of path information composing said path-information group on the basis of said time-slot-allocation information.

3. An intensive management apparatus according to claim 1 wherein said path-information-checking unit forms a judgment as to whether or not said allocated-time-slot number described in specific path information is equal to said allocated-time-slot number described in each of a plurality of other pieces of path information each including the same group identifier as said group identifier included in said specific path information on the basis of said time-slot-allocation information.

4. An intensive management apparatus according to claim 1 wherein:
    said termination included a connection type indicating an interface type of each of said terminating connection points; and
    said path-information-checking unit forms a judgment as to whether or not 2 or more terminating connection points each having a terminal interface type are described in pieces pf termination information included in any pieces of path information composing a path-information group where said terminal interface type is said interface type of said terminals.

5. An intensive management apparatus according to claim 4 wherein:
    path information includes a terminal-I/F category if said connection type indicates said terminal interface type; and
    if a path-information group includes pieces of path information describing 2 or more terminating connection points each having said connection type indicating said terminal interface type, said path-information-checking unit forms a judgment as to whether or not said terminal interface type of one of said terminating connection points is compatible with said terminal interface type of any other of said terminating connection points on the basis of said terminal-I/F category included in each of said pieces of path information.

6. An intensive management apparatus according to claim 1 wherein, if a path-information group includes pieces of path information describing 2 or more terminating connection points each having said connection type indicating said terminal interface type, said path-information-checking unit forms a judgment as to whether or not it is possible to connect a path connected to one of said terminating connection points having said connection type indicating said terminal interface type to a path connected to any other of said terminating connection points having said connection type indicating said terminal interface type by sequential connection of adjacent paths sharing common terminating connection points and pertaining to said path-information group.

7. An intensive management apparatus according to claim 1 wherein said path-information-checking unit forms a judgment as to whether or not any of said time slots allocated at each of said terminating connection pints is shared by paths identified by different group identifiers the basis of said time-slot-allocation information.

8. An intensive management apparatus, for managing a time-sharing multiplexing network including:
    a plurality of terminals;
    a plurality of communication apparatuses each for communicating transmitted data accommodated in each of time slots by mapping said transmitted data onto said time slots allocated to a transmission line and allocated in said communication apparatus for transmitting said transmitted data on the basis of line-setting information; and
    a plurality of transmission lines connecting said communication apparatuses to each other,
    said intensive management apparatus comprising:
    a path-information-creating unit for creating path information including a group identifier, termination information of terminating connection points, a path management number assigned to a path connecting said terminating connection points at which said time slots in said communication apparatus are allocated and an allocated-time-slot number;

a time-slot-allocating unit for creating time-slot-allocation information describing allocation of said time slot to path identified by said path management number included I said time-slot-allocation information at each of said terminating connection points;

a path-information-checking unit for forming a judgment on validity of each of a plurality of paths identified by the same value of said group identifier assigned to a path-information group comprising pieces of path information describing said paths on the basis of said path information; and a result display unit for displaying results of said judgment on validity of said paths, wherein sad path-information-checking unit forms a judgments to whether or not a time slot is shared by another path pertaining to said path-information group at each of said terminating connection points described in said pieces of path information composing said path-information group on the basis of said time-slot-allocation, and wherein:

said path information includes a line-implementation identifier showing a direction of data transmitted through a path between said terminating connection points described in said path information;

said time-slot-allocation information is created for each of 2 directions of transmitted data at each of said terminating connection points, and said path-information-checking unit forms a judgment as to whether or not a time slot is shared by a plurality of paths pertaining to a path-information group on the basis of pieces pertaining to a path-information group on the basis of pieces of time-slot-allocation information created for the same direction at a terminating connection point common to pieces of path information composing said path-information group.

9. An intensive management apparatus for managing a time-sharing multi-plexing network including:

a plurality of terminals;

a plurality of communication apparatuses each for communicating transmitted data accommodated in each of time slots by mapping said transmitted data onto said time slots allocated to a transmission line and allocated in said communication apparatus for transmitting said transmitted data on the basis of line-setting information; and a plurality of transmission lines connecting said communication apparatuses to each other, said intensive management apparatus comprising:

a path-information-creating unit for creating path information including a group identifier, termination information of terminating connection points, a path management number assigned to a path connecting said terminating connection points at which said time slots in said communication apparatus are allocated and an allocated-time-slot number;

a time-slot allocating unit for creating time-slot-allocation information describing allocation of said time slots to a path identified by said path management number included in said time-slot-allocation information at each of said terminating connection points;

a path-information-checking unit for forming a judgment on validity of each of a plurality of paths identified by the same value of said group identifier assigned to a path-information group comprising pieces of path information describing said paths on the basis of said path information; and a result display unit for displaying results of said judgement on validity of said paths, wherein, if a path-information group includes pieces of path information describing 2 or more terminating connection points each having said connection type indicating said terminal interface type, said path-information-checking unit forms a judgment as to whether or not it is possible to connect a path connected to one of said terminating connection points having said connection type indicating said terminal interface type by sequential connection of adjacent paths sharing common terminating connection points and pertaining to said path-information group, and wherein:

each path information includes a line-implementation identifier showing a direction of data transmitted through a path showing a direction of data transmitted through a path between said terminating connection points described in said path information; and said path-information-checking unit carries out;

first processing to identify a path connected to a terminating connection point having said connection type indicating said terminal interface type as a path connected to a transmission-side terminal interface type as a path connected to a transmission-side terminal and a path connection type indicating said terminal interface type as a path connected to a reception-side terminal on the basis of said line-implementation identifier;

second processing to set a terminating connection point existing on said path connected to said transmission-side terminal and having connection type other than said terminal interface type as another terminating connection point;

third processing to repeat;

first sub-processing to select a next path sharing said other terminating connection point as a terminating connection point on a transmission side of said next path; and second sub-processing to set a terminating connection point located on said next path and different from said other terminating connection point as a terminating connection point to be used in next first sub-processing as a substitute for said other terminating connection point, and fourth processing to form a judgment as to whether or not it is possible to connect said path connected to said transmission-side terminal to said path connected to said reception-side terminal.

* * * * *